(12) United States Patent
Chen

(10) Patent No.: US 10,034,358 B1
(45) Date of Patent: Jul. 24, 2018

(54) USER CONTROLLABLE GROW LIGHTING SYSTEM, METHOD, AND ONLINE LIGHT SETTINGS STORE

(71) Applicant: Xiaolai Chen, Markham (CA)

(72) Inventor: Xiaolai Chen, Markham (CA)

( * ) Notice: Subject to any disclaimer, the term of this patent is extended or adjusted under 35 U.S.C. 154(b) by 0 days.

(21) Appl. No.: 15/782,792

(22) Filed: Oct. 12, 2017

Related U.S. Application Data

(60) Provisional application No. 62/530,140, filed on Jul. 8, 2017.

(51) Int. Cl.
| | |
|---|---|
| H05B 37/02 | (2006.01) |
| H05B 33/08 | (2006.01) |
| F21V 23/04 | (2006.01) |
| A01G 7/04 | (2006.01) |
| A01G 9/26 | (2006.01) |

(52) U.S. Cl.
CPC ......... *H05B 37/0272* (2013.01); *A01G 7/045* (2013.01); *A01G 9/26* (2013.01); *F21V 23/0435* (2013.01); *H05B 33/0857* (2013.01); *H05B 33/0863* (2013.01); *H05B 33/0869* (2013.01); *H05B 37/0236* (2013.01); *H05B 37/0281* (2013.01)

(58) Field of Classification Search
CPC .......................... H05B 37/02; H05B 37/0236; H05B 37/0272; H05B 37/0281; H05B 33/08; H05B 33/0857; H05B 33/0863; H05B 33/0869; A01G 7/045; A01G 9/26; F21V 23/0435

USPC .... 315/185 R, 112, 113, 117, 118, 130–132, 315/151–153, 291, 307, 308, 312
See application file for complete search history.

(56) References Cited

U.S. PATENT DOCUMENTS

2017/0034895 A1* 2/2017 Vogel .................... A01G 22/00

* cited by examiner

*Primary Examiner* — Jimmy Vu
(74) *Attorney, Agent, or Firm* — Conneely PC; Joseph Conneely

(57) ABSTRACT

A method for controlling a smart LED grow lamp device, comprising: using a processor, selecting a light recipe from an online light recipe store server via a user interface of a wireless device communicatively coupled to the online light recipe store server over a network, the light recipe including spectrum type, intensity, and duration selections for LEDs included in the smart LED grow lamp device; downloading the light recipe from the online light recipe store server to the wireless device; generating control signals for the smart LED grow lamp device from the light recipe at the wireless device; and, transmitting the control signals to the smart LED grow lamp device from the wireless device to thereby control the smart LED grow lamp device. The smart LED grow lamp device can be voice activated, can include a camera, and can be intelligently controlled by using images from the camera to monitor plant growth, diagnose problems (e.g., lighting, water, temperature, etc.), generate user alerts, and automatically adjust light settings accordingly.

20 Claims, 26 Drawing Sheets

| Germination | |
|---|---|
| Period | 0 days |
| Blue | |
| Red | |
| Infra-Red | |
| UVB | |
| Laser | |
| Temperature | 77°F |

Germination

Period                0 days

Blue

① Intensity:54%      14:44~16:44

Red

Infra-Red

UVB

Laser

Temperature          77°F

USER CONTROLLABLE GROW LIGHTING SYSTEM, METHOD, AND ONLINE LIGHT SETTINGS STORE

This application claims priority from and the benefit of the filing date of U.S. Provisional Patent Application No. 62/530,140, filed Jul. 8, 2017, and the entire content of such application is incorporated herein by reference.

FIELD OF THE APPLICATION

This application relates to the field of horticultural lighting, and more specifically, to a user controllable grow lighting system, method, and online light settings store.

BACKGROUND OF THE APPLICATION

Growing plants indoors has increased in popularity in recent years for several reasons. First, people are paying more attention to the quality of the food they consume. Consequently, growing plants for food at home by themselves has increased in popularity. Second, an increasing number of people have begun growing cash crops, such as flowers, at home for sale online. To effectively grow plants indoors, plant or grow lighting is typically required. Such lighting must be reliable and functional.

The development of new grow lighting for home use is also being driven by the rise in home grown marijuana. Growing marijuana for both medicinal and non-medicinal use is legal in many U.S. states and will be legalized in Canada by 2018. As the quality of marijuana depends on growing conditions, and most importantly lighting, the demand for grow lighting is expected to increase dramatically.

However, existing grow lighting systems for home use have several disadvantages. The first generation of grow lighting equipment included high-intensity discharge ("HID") lamps, metal-halide ("MH") lamps, and fluorescent lamps or tubes. Fluorescent tubes are often too long to use in small scale indoor operations. They are most commonly used in commercial operations. HID and MH lamps are designed for general lighting purposes and are typically not suitable for grow lighting due to their low efficiency and high heat generation. Second generation ceramic discharge lamps ("CDL") provided a better solution for grow lighting as they overcame some of the disadvantages of first generation products. But, heat, power efficiency and bulb reliability remain problematic for such second generation solutions.

The third generation of grow lighting is based on light emitting diode ("LED") based lamps and systems. Research into plant growth and development of LED technology has led to the emergence of LED lighting as the best solution for plant growing. Research has found that red and blue light are significant factors for improved plant growth, especially for photosynthesis. At the same time, new LED lamps can create any specific light color including red and blue light. This feature of LED lamps shows great promise for the use of LED lamps in the grow lighting field.

Due to consumer demand, many LED-based grow lighting systems are available. However, most of these existing products are not actually suitable for grow lighting as their light spectrum settings are not appropriate for enhancing plant growth. In addition, existing systems have low durability, short-life spans, noisy fans, poor industrial design, and ineffective controls. For example, while products such as the Titan™ series from Cirrus™ use LED lamps, these systems typically only control light intensity.

A need therefore exists for an improved user controllable grow lighting system and method. Accordingly, a solution that addresses, at least in part, the above and other shortcomings is desired.

SUMMARY OF THE APPLICATION

According to one aspect of the application, there is provided a method for controlling a smart LED grow lamp device, comprising: using a processor, selecting a light recipe from an online light recipe store server via a user interface of a wireless device communicatively coupled to the online light recipe store server over a network, the light recipe including spectrum type, intensity, and duration selections for LEDs included in the smart LED grow lamp device; downloading the light recipe from the online light recipe store server to the wireless device; generating control signals for the smart LED grow lamp device from the light recipe at the wireless device; and, transmitting the control signals to the smart LED grow lamp device from the wireless device to thereby control the smart LED grow lamp device.

According to another aspect of the application, there is provided a smart LED grow lamp device, comprising: a cover mounted over a base; an array of non-laser LEDs mounted on an outer surface of the base, the array of non-laser LEDs selectively operable to illuminate at least one plant; at least one laser LED mounted on the outer surface of the base, the at least one laser LED selectively operable to illuminate the at least one plant; a plurality of heat fins formed on an outer surface of the cover for dissipating heat generated by the array of non-laser LEDs and the at least one laser LED; an antenna adapted to receive control signals; and, a control unit coupled to the antenna, the array of non-laser LEDs, and the at least one laser LED and adapted to process the control signals and control operations of the array of non-laser LEDs and the at least one laser LED.

In accordance with further aspects of the application, there is provided an apparatus such as a data processing system, a grow lighting control system, an online store hosting system or server, a plant growth big data collection system, a global control cloud server, a control system, a wireless device, a smart phone, a controller, a computer system, etc., a method for adapting same, as well as articles of manufacture such as a computer readable medium or product and computer program product or software product (e.g., comprising a non-transitory medium) having program instructions recorded thereon for practicing the method of the application.

BRIEF DESCRIPTION OF THE DRAWINGS

Further features and advantages of the embodiments of the present application will become apparent from the following detailed description, taken in combination with the appended drawings, in which:

FIG. 19 is a screen capture illustrating a light setting selection screen of the lamp control APP in accordance with an embodiment of the application;

FIG. 23 is a screen capture illustrating the set up of one kind (or wavelength) of light on the light setting selection screen of FIG. 19 in accordance with an embodiment of the application;

It will be noted that throughout the appended drawings, like features are identified by like reference numerals.

DETAILED DESCRIPTION OF EXAMPLE EMBODIMENTS

Figure 1:
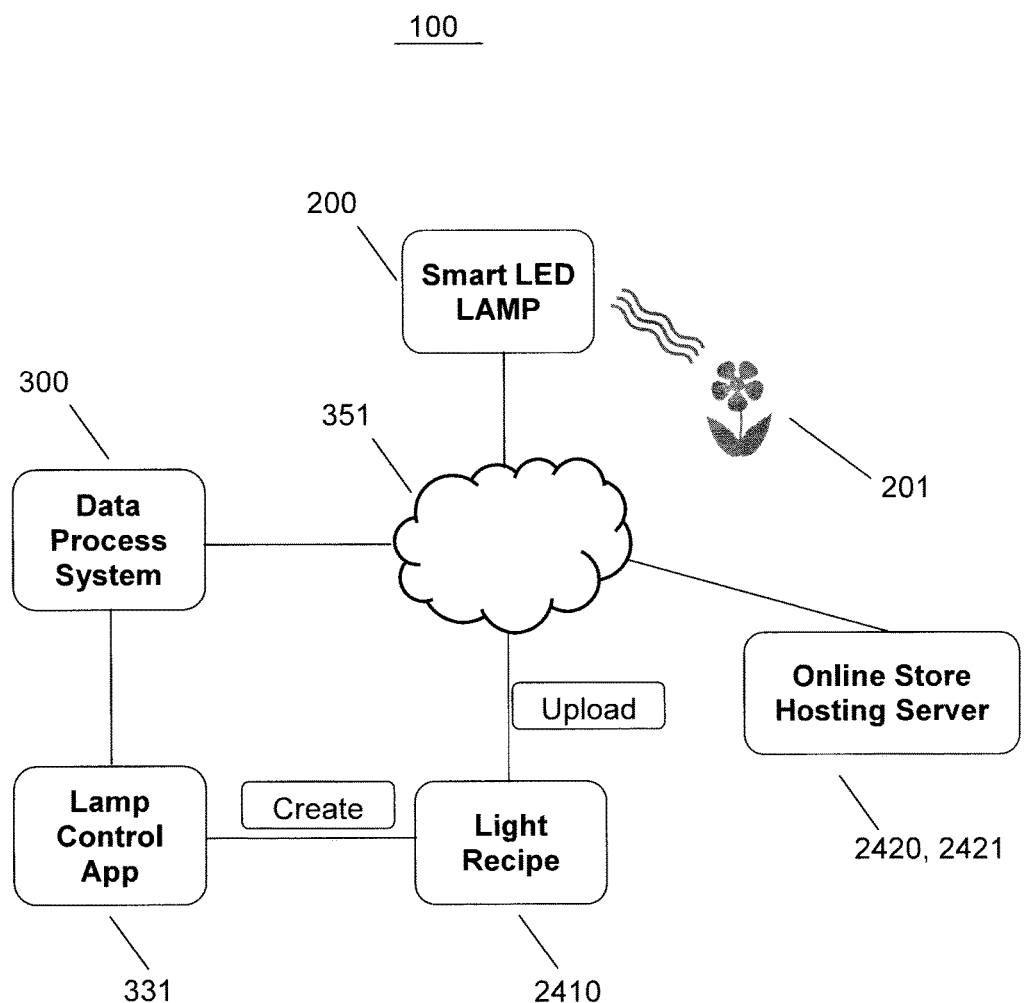
FIG. 1 is a block diagram illustrating a user controllable grow lighting system in accordance with an embodiment of the application.

In the following description, details are set forth to provide an understanding of the application. In some instances, certain software, circuits, structures and methods have not been described or shown in detail in order not to obscure the application. The term "data processing system" or "system" is used herein to refer to any machine for processing data, including the grow lighting control systems, online store hosting systems or servers, plant growth big data collection systems, global control cloud servers, control systems, wireless devices, smart phones, controllers, computer systems, and network arrangements described herein. The present application may be implemented in any computer programming language provided that the operating system of the data processing system provides the facilities that may support the requirements of the present application. Any limitations presented would be a result of a particular type of operating system or computer programming language and would not be a limitation of the present application. The present application may also be implemented in hardware or in a combination of hardware and software.

According to one embodiment of the application, there is provided a user controllable grow lighting system, method, and online settings store. In particular, the system includes a smart LED grow lamp device which is controlled by a lamp control application ("APP") running on a smart phone, wireless device, or other data processing system via wireless communications (e.g., "WIFI"). The APP is capable of controlling both light intensity and light scheduling for the grow lamp device. In addition, the smart LED grow lamp device included in the system provides light in the portions of the spectrum that are most suitable for marijuana growth, for example. Furthermore, the smart LED grow lamp device has been designed for home use in that it is both stylish and quiet. In particular, the smart LED grow lamp device does not include a fan and hence has a long life-span, generates little or no noise, and has an increased level of waterproofing. The system is designed for home users and enhancing the growing experience for such users. To this end, the system includes a community knowledge sharing platform that allows users to communicate and share their experiences with others to learn how to better grow their plants. The APP includes a "Light Recipe Store" function which allow users to upload or sell their light settings or "light recipes" via and online store. Using the APP, other users may review, download, and/or buy the uploaded light recipes for use with their own APP and system. Through the smart LED grow lamp device's built-in camera, users may remotely review or check the growth status of their plants by viewing real-time video or images taken by the camera and stored on a cloud server. In addition, the system can analyze plant growth status from theses images and can make adjustments in the light settings automatically in order to have improve plant growth. For example, the images captured by the camera may be compared to standard or normal images (e.g., based on growth stage, plant type, etc.) stored on the cloud server to diagnose growth problems and to adjust light settings if abnormal conditions or symptoms are detected. Lack of water and other problems may also be detected in this way. Furthermore, a user may be informed of such problems and required actions by way of a message or other indication delivered to their APP.

Figure 26:
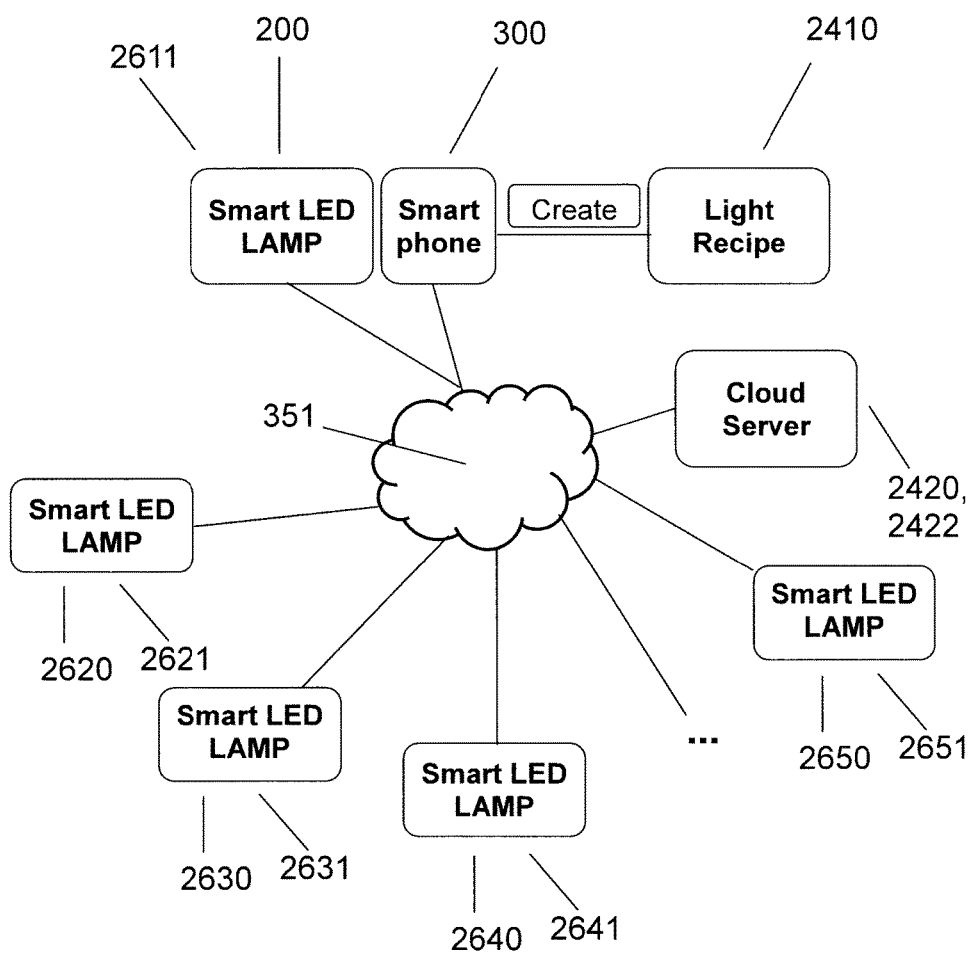

FIG. 1 is a block diagram illustrating a user controllable grow lighting system 100 in accordance with an embodiment of the application. And, FIG. 26 is a block diagram illustrating a grow lighting system 2600 having distributed smart LED grow lamp devices 200, 2620, 2630, 2640, 2650 for implementing a "following mode" of operation in accordance with an embodiment of the application. Referring to FIG. 1, the grow lighting system 100 includes a smart LED grow lamp device 200 communicatively coupled to a data processing system 300 (e.g., a smart phone or wireless device) over a network 351 (e.g., a WIFI network). The data processing system 300 runs a software module (e.g., an application ("APP")) 331 for controlling the smart LED grow lamp device 200. The data processing system 300 may also be communicatively coupled to an online store hosting server 2420 and/or other devices 300 over a network 351 (e.g., a WIFI network, cellular network, etc.). As further described below with reference to FIG. 24, the APP 331 allows a user to control the smart LED grow lamp device 200 via their smart phone or wireless device 300. The APP 331 provides for remote WIFI controlled, adjustable, multifunctional grow lighting control especially suitable for marijuana plant (e.g., 201) cultivation. The APP 331 may be used to control both the intensity and duration of operations of LEDs 10, 11, 12, 16 (see FIG. 6) in the smart LED grow lamp device 200. The ability to create and share light recipes 2410 is also provided. A user may create a light recipe 2410 using the APP 331 and upload the light recipe 2410 to the online store hosting server 2420. The uploading user may quote a price for their light recipe 2410. Other users may review uploaded recipes 2410, pay and download selected recipes 2410, and comment on the recipes 2410 included or stored in the online store hosting server 2420. The online store 2420 allows users to communicate with each other and share their experiences.

According to one embodiment, the online store hosting server 2420 may include or perform the function of a plant growth big data collection system 2421. The big data collection system 2421 may store light recipes 2410, data, images, and video gathered from one more wireless devices 300 running an APP 331 for the control of one or more smart LED grow lamp devices 200. The light recipes 2410, data, and images stored the big data collection system 2421 may be used for subsequent study and research on plant growth for various species of plants 201. For example, the light recipes 2410, data, and images stored in the big data collection system 300 may be analyzed to determine optimal light recipes for various species of plants 201. According to another embodiment, the plant growth big data collection system 2421 may be a separate system (e.g., 300) from the online store hosting server 2420.

According to one embodiment, as shown in FIG. 26, the online store hosting server 2420 may include or perform the function of a smart LED grow lamp device global control cloud server 2422 for implementing a "following mode" of operation as described in the following. The global control cloud server 2422 may be used as a platform to control multiple smart LED grow lamp devices 200, 2620, 2630, 2640, 2650 that are located at different locations 2610, 2620, 2630, 2640, 2650. For example, a first user of a smart LED grow lamp device 200 that is located at a first location 2611 may be a professional or expert grower of certain plant species, that is, at least in the minds of the user's clients or followers. The first user may create a light recipe 2410 for cultivating certain plants 201. Other grow lamp device users may have their smart LED grow lamp devices 2620, 2630, 2640, 2650 located at respective locations 2621, 2631, 2641, 2651 remote from the first location 2611. These other users may believe that the first user is an expert grower or user and so they may want the first user to take over control of the growth (i.e., lighting) of their plants. Instead of downloading the first user's light recipe 2410 for use with their own devices, the other users may choose to allow the first user to remotely control their smart grow lamp devices 2620, 2630, 2640, 2650. The other users may be referred to as the first user's "followers". The first user may connect his/her mobile APP 331 to his/her own grow lamp device 200 which is located locally 2611 and, with his/her followers' permission, to each of his/her followers' grow lamp devices 2620, 2630, 2640, 2650 which are located at respective remote locations 2621, 2631, 2641, 2651 via the network 351 and/or global control cloud server 2422. The settings and light recipe 2410 applied to the first user's device 200 at the first location 2611 may be applied to the follower' devices 2620, 2630, 2640, 2650 at their respective remote locations 2621, 2631, 2641, 2651. As such, the followers do not need to manage the light settings for their own devices 2620, 2630, 2640, 2650. They need only take care of the other requirements of their plants 201 (e.g., watering, etc.). For this service, the first user may charge a predetermined or set fee. The collection of these fees may be managed by the online store hosting server 2420 or global control cloud server 2422. According to another embodiment, the global control cloud server 2422 may be a separate system (e.g., 300) from the online store hosting server 2420. Thus, via the "following mode" of operation for using a light recipe 2410, with other users' permission, the expert user may access the other users' devices 2620, 2630, 2640, 2650 and use the same light recipe 2410 as used on the expert user's device 200 on the other users' devices 2620, 2630, 2640, 2650. In this way, the other users need not worry about managing their light settings themselves. The following mode of operation allows other users that may be located globally to follow the expert user to grow their plants.

Figure 2:
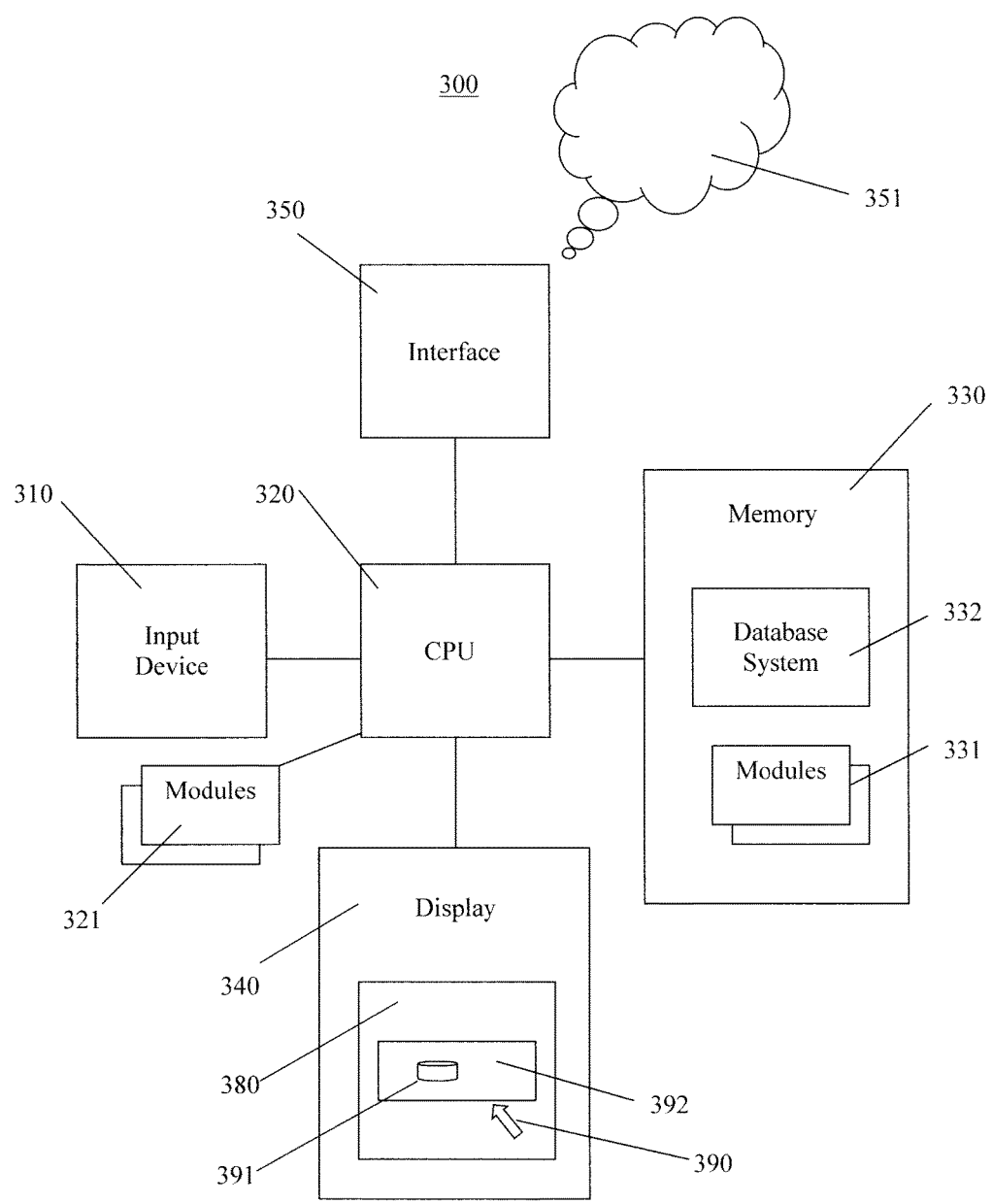
FIG. 2 is a block diagram illustrating a data processing system in accordance with an embodiment of the application.

FIG. 2 is a block diagram illustrating a data processing system 300 in accordance with an embodiment of the invention. The data processing system 300 is suitable for performing as a grow lighting control system, an online store host system or server 2420, a plant growth bid data collection system 2421, a global control cloud server 2422, a control system, a smart phone, a wireless device, or the like. The data processing system 300 is also suitable for data processing, management, storage, and for generating, displaying, and adjusting presentations in conjunction with a user interface or a graphical user interface ("GUI"), as described below. The data processing system 300 may be a handheld or wireless device such a smart phone or cellular telephone capable of running software applications ("APPS"). In addition, the data processing system 300 may be a client and/or server in a client/server system. For example, the data processing system 300 may be a server system or a personal computer ("PC") system. In addition, the data processing system 300 may also be a distributed system which is deployed across multiple processors. Furthermore, the data processing system 300 may also be a virtual machine. The data processing system 300 includes an input device 310, at least one central processing unit ("CPU") 320, memory 330, a display 340, and an interface device 350. The input device 310 may include a keyboard, a mouse, a trackball, a touch sensitive surface or screen, a position tracking device, an eye tracking device, a camera, a tactile glove or gloves, a gesture control armband, or a similar device. The display 340 may include a computer screen, a television screen, a display screen, a terminal device, a touch sensitive display surface or screen, a hardcopy producing output device such as a printer or plotter, a head-mounted display, virtual reality ("VR") glasses, an augmented reality ("AR") display, a hologram display, or a similar device. The memory 330 may include a variety of storage devices including internal memory and external mass storage typically arranged in a hierarchy of storage as understood by those skilled in the art. For example, the memory 330 may include databases, random access memory ("RAM"), read-only memory ("ROM"), flash memory, and/or disk devices. The interface device 350 may include one or more network connections. The data processing system 300 may be adapted for communicating with other data processing systems (e.g., a smart LED grow lamp device 200, systems similar to the data processing system 300, etc.) over a network 351 via the interface device 350. For example, the interface device 350 may include an interface to a network 351 such as the Internet and/or another wired or wireless network (e.g., a wireless local area network ("WLAN"), a cellular telephone network, a WIFI network, a BlueTooth™ network, etc.). As such, the interface 350 may include suitable transmitters, receivers, antennae, etc. Thus, the data processing system 300 may be linked to other data processing systems by the network 351. In addition, the interface 351 may include one or more input and output connections or points for connecting various sensors, status (indication) inputs, analog (measured value) inputs, counter inputs, analog outputs, and control outputs to the data processing system 300. In addition, the data processing system 300 may include a Global Positioning System ("GPS") receiver. The CPU 320 may include or be operatively coupled to dedicated coprocessors, memory devices, or other hardware modules 321. The CPU 320 is operatively coupled to the memory 330 which stores an operating system (e.g., 331) for general management of the system 300. The CPU 320 is operatively coupled to the input device 310 for receiving user commands, queries, or data and to the display 340 for displaying the results of these commands, queries, or data to the user. Commands, queries, and data may also be received via the interface device 350 and results and data may be transmitted via the interface device 350. The data processing system 300 may include a data store or database system 332 for storing data and programming information. The database system 332 may include a database management system (e.g., 332) and a database (e.g., 332) and may be stored in the memory 330 of the data processing system 300. In general, the data processing system 300 has stored therein data representing sequences of instructions which when executed cause the method described herein to be performed. Of course, the data processing system 300 may contain additional software and hardware a description of which is not necessary for understanding the application.

Thus, the data processing system 300 includes computer executable programmed instructions for directing the system 300 to implement the embodiments of the present application. The programmed instructions may be embodied in one or more hardware modules 321 or software modules (or applications ("APPs")) 331 resident in the memory 330 of the data processing system 300 or elsewhere (e.g., 320). Alternatively, the programmed instructions may be embodied on a computer readable medium or product (e.g., one or more digital video disks ("DVDs"), compact disks ("CDs"), memory sticks, etc.) which may be used for transporting the programmed instructions to the memory 330 of the data processing system 300. Alternatively, the programmed instructions may be embedded in a computer-readable signal or signal-bearing medium or product that is uploaded to a network 351 by a vendor or supplier of the programmed instructions, and this signal or signal-bearing medium or product may be downloaded through an interface (e.g., 350) to the data processing system 300 from the network 351 by end users or potential buyers.

A user may interact with the data processing system 300 and its hardware and software modules 321, 331 using a user interface such as a graphical user interface ("GUI") 380 (and related modules 321, 331). The GUI 380 may be used for monitoring, managing, and accessing the data processing system 300. GUIs are supported by common operating systems and provide a display format which enables a user to choose commands, execute application programs, manage computer files, and perform other functions by selecting pictorial representations known as icons, or items from a menu through use of an input device 310 such as a mouse. In general, a GUI is used to convey information to and receive commands from users and generally includes a variety of GUI objects or controls, including icons, toolbars, drop-down menus, text, dialog boxes, buttons, and the like. A user typically interacts with a GUI 380 presented on a display 340 by using an input device (e.g., a mouse) 310 to position a pointer or cursor 390 over an object (e.g., an icon) 391 and by selecting or "clicking" on the object 391. Typically, a GUI based system presents application, system status, and other information to the user in one or more "windows" appearing on the display 340. A window 392 is a more or less rectangular area within the display 340 in which a user may view an application or a document. Such a window 392 may be open, closed, displayed full screen, reduced to an icon, increased or reduced in size, or moved to different areas of the display 340. Multiple windows may be displayed simultaneously, such as: windows included within other windows, windows overlapping other windows, or windows tiled within the display area.

Figure 3:
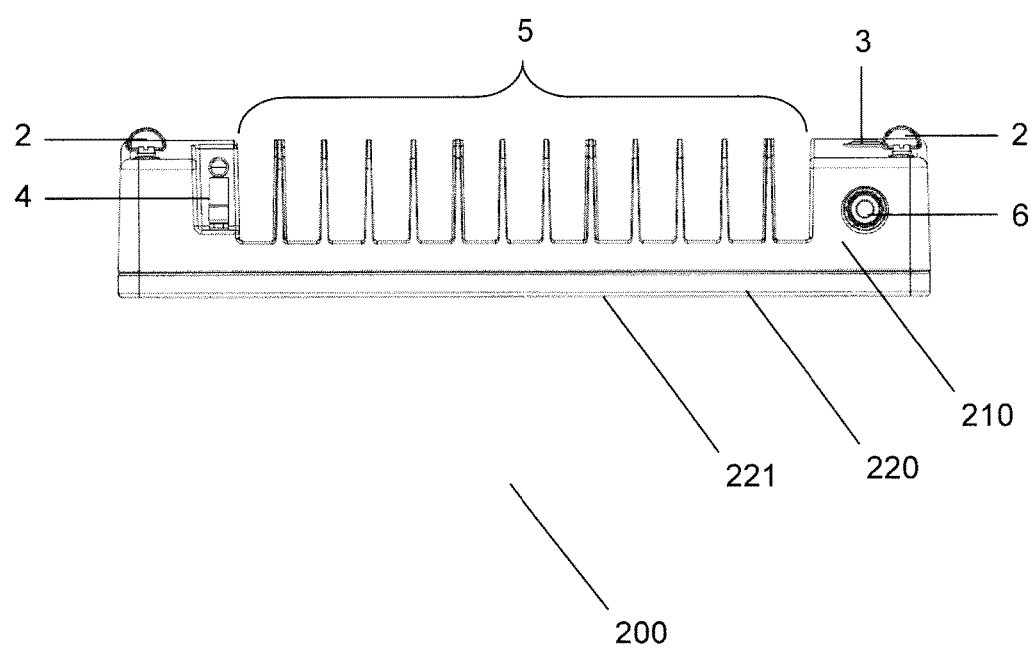
FIG. 3 is a rear view illustrating a smart LED grow lamp device in accordance with an embodiment of the application.
Figure 4:
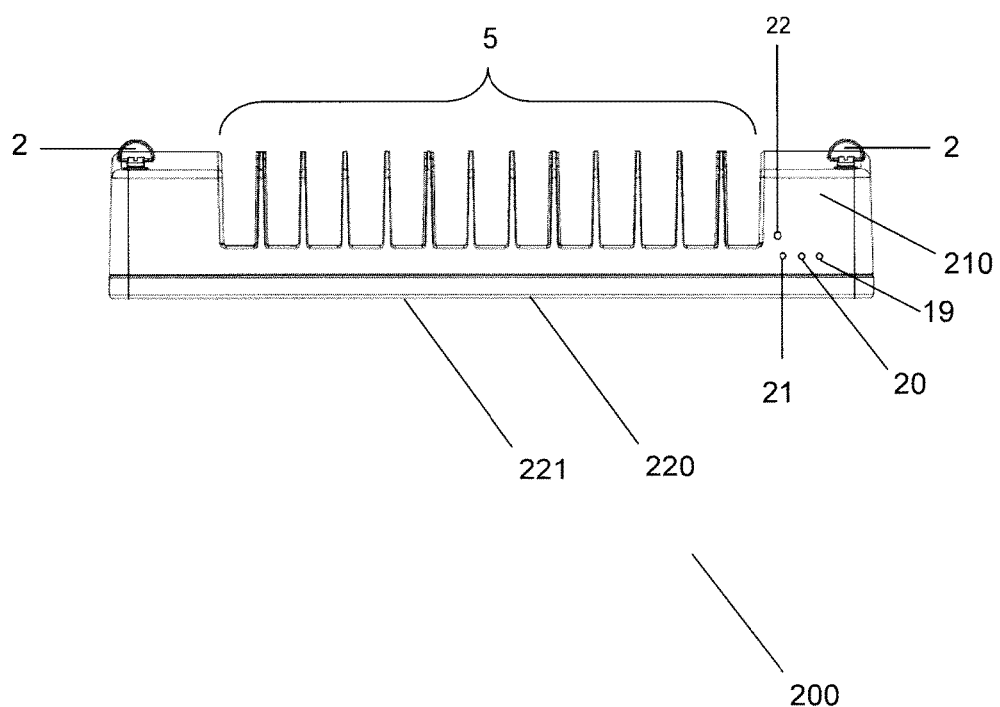
FIG. 4 is a front view thereof.
Figure 5:
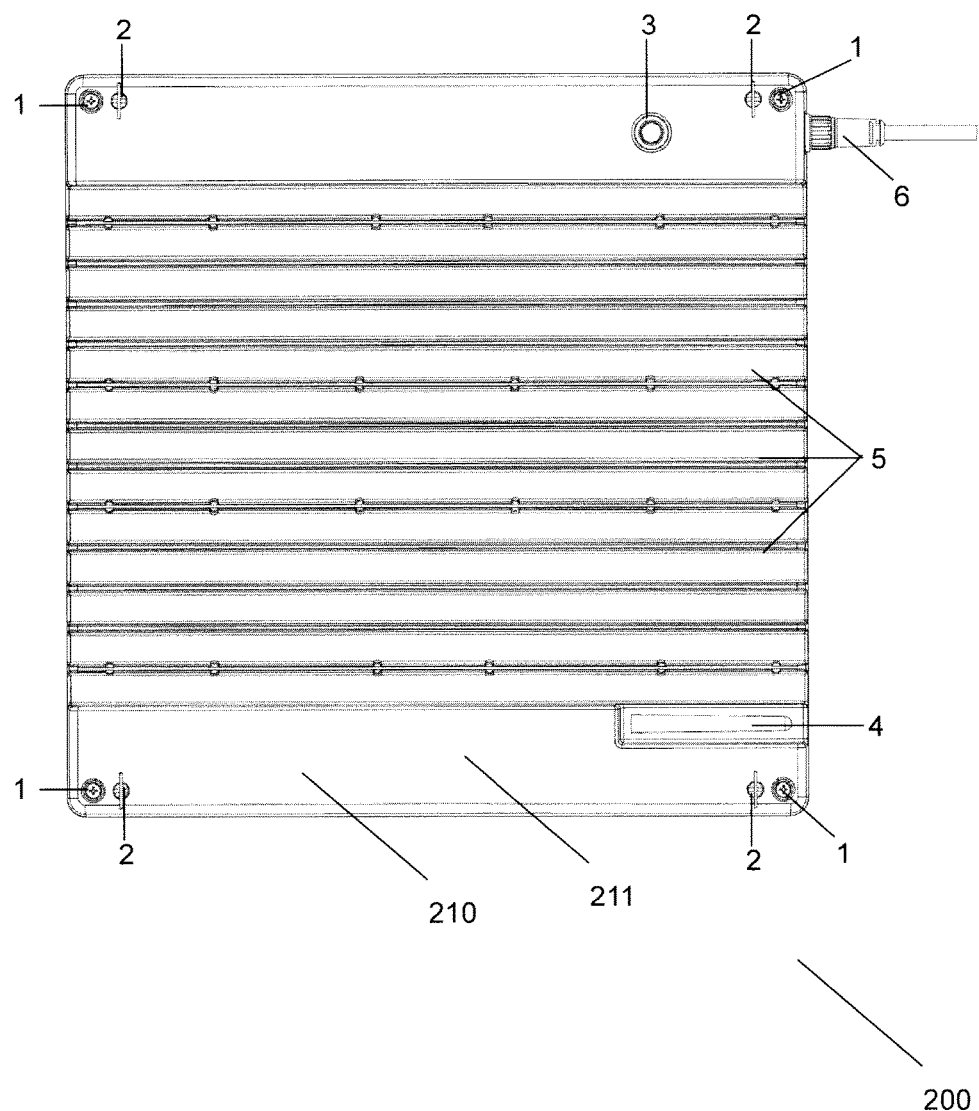
FIG. 5 is a top view thereof.
Figure 6:
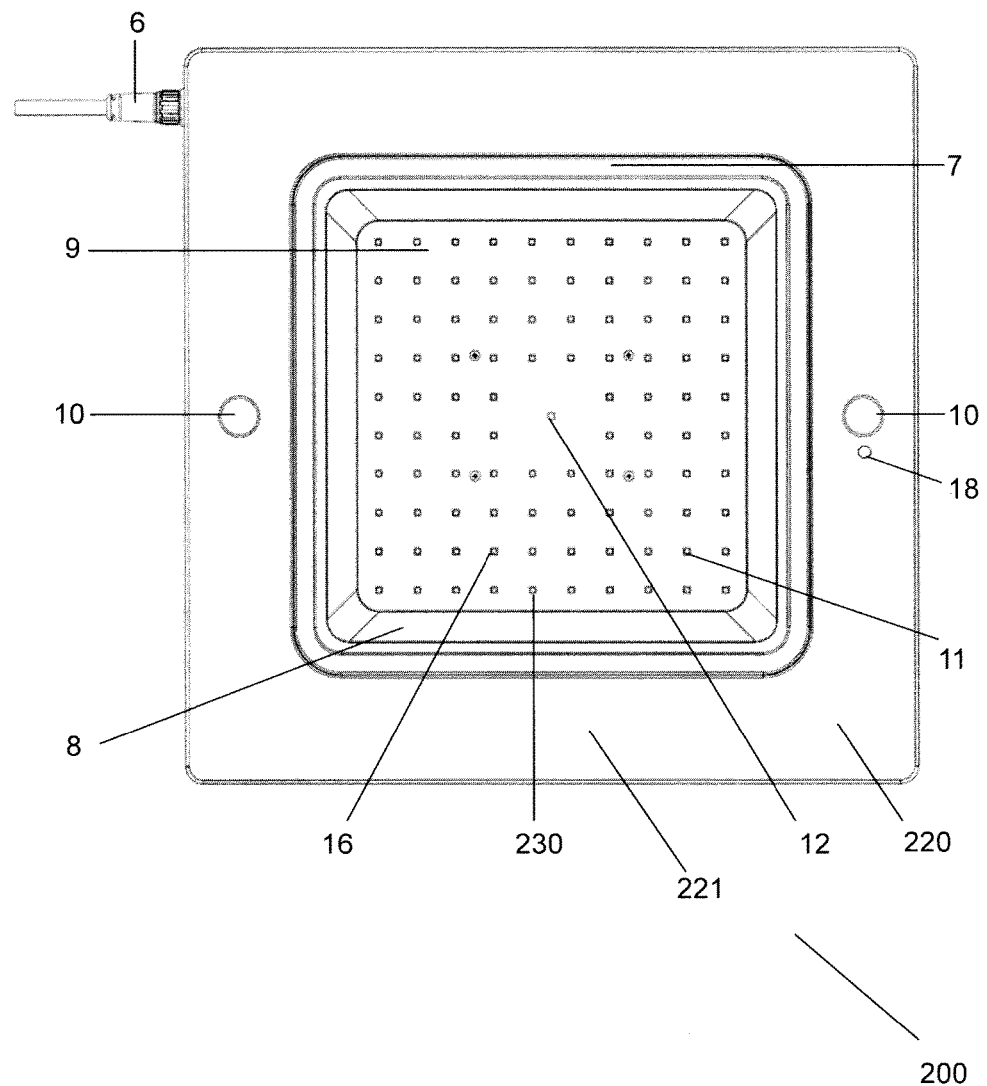
FIG. 6 is a bottom view thereof.
Figure 7:
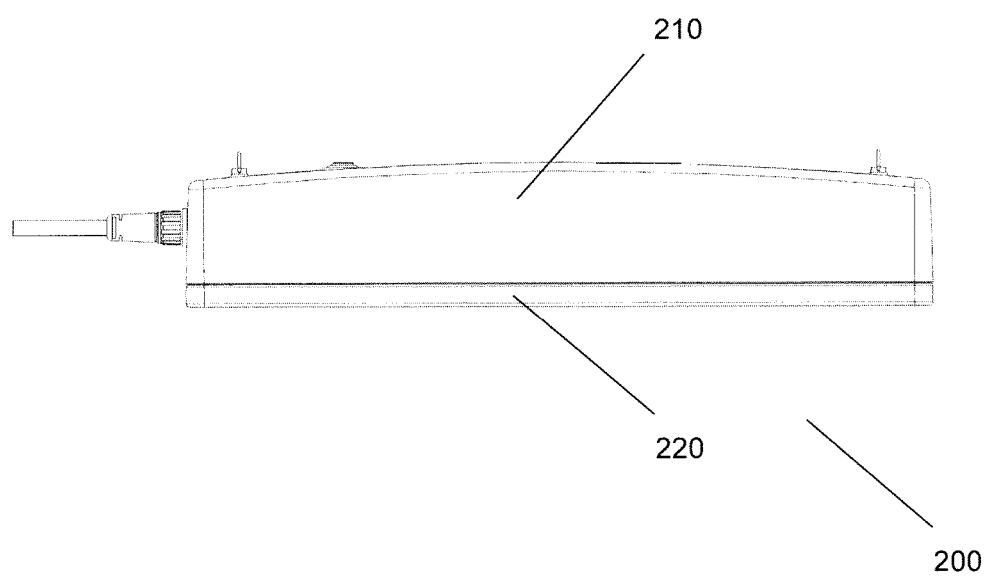
FIG. 7 is a left side view thereof.
Figure 8:
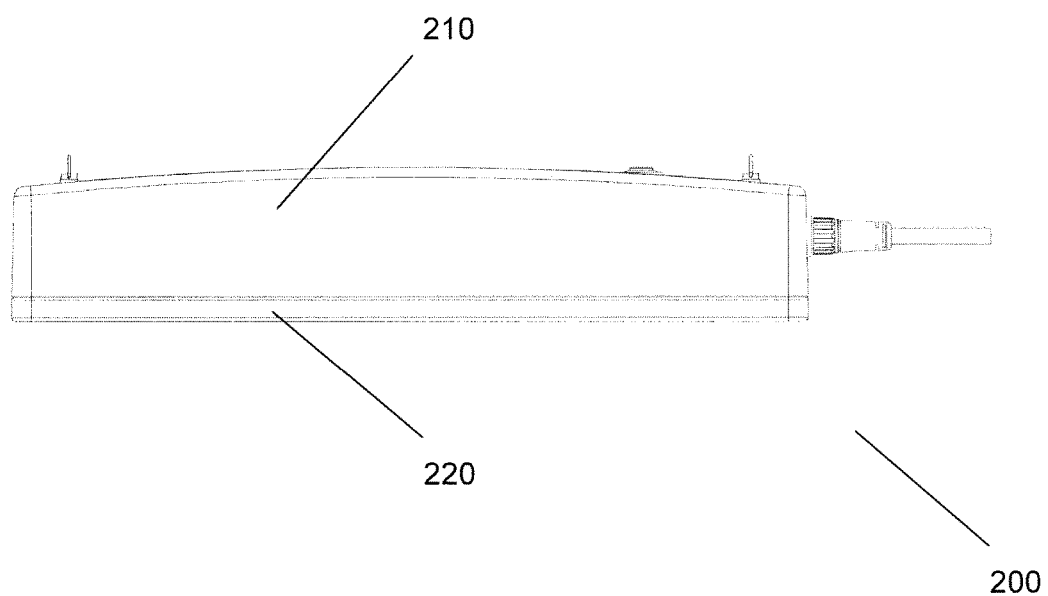
FIG. 8 is a right side view thereof.
Figure 9:
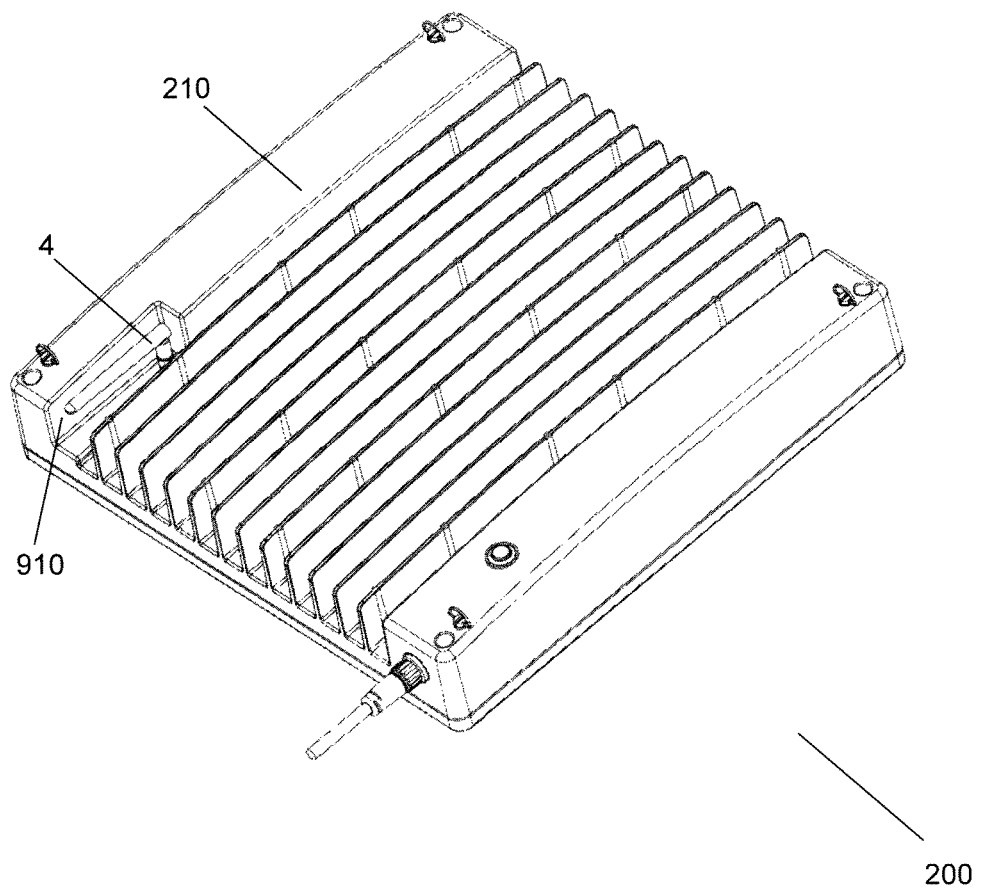
FIG. 9 is a rear top perspective view thereof with an antenna thereof shown in folded or retracted position.
Figure 10:
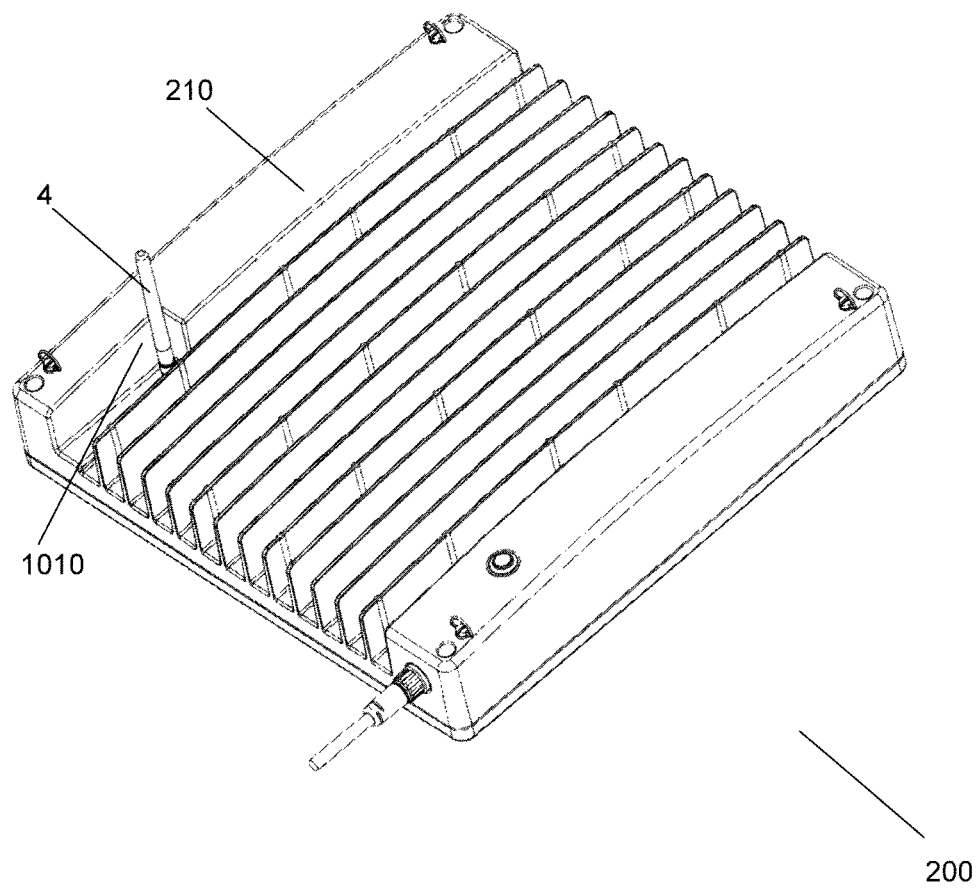
FIG. 10 is a rear top perspective view thereof with the antenna thereof shown in an unfolded or extended position.
Figure 11:
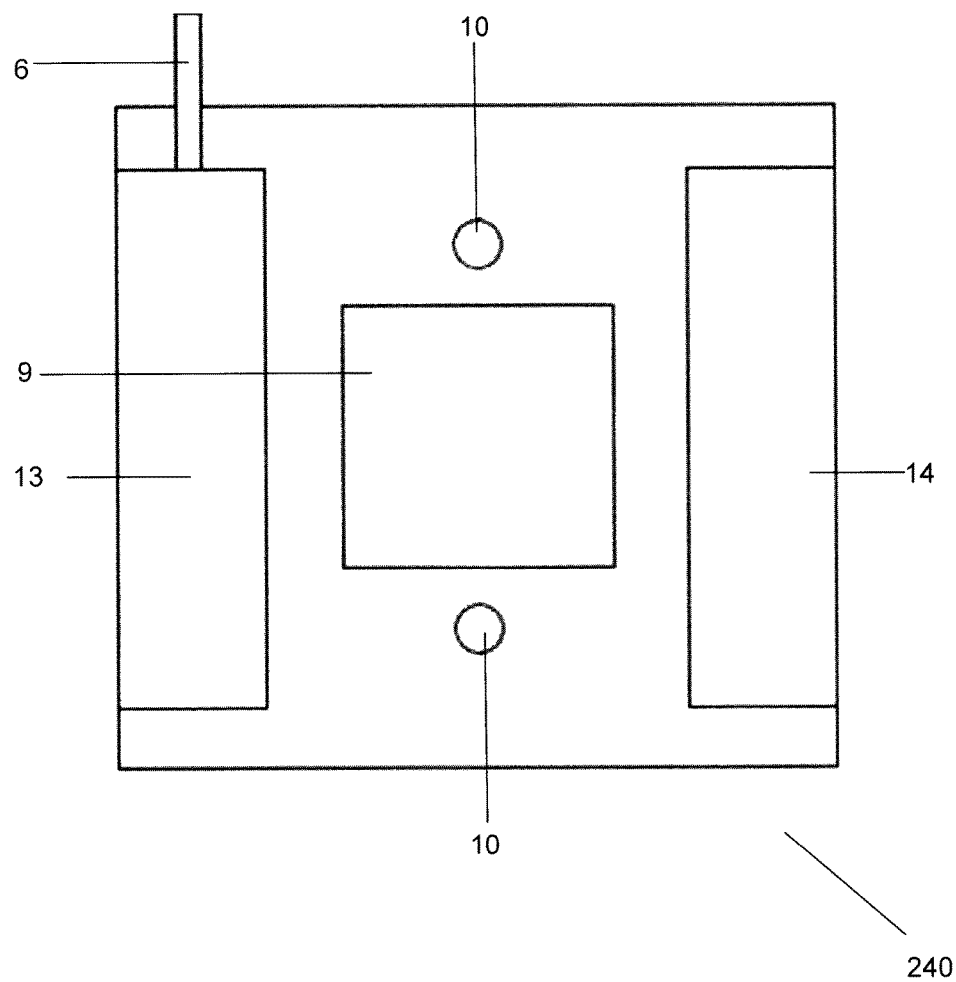
FIG. 11 is a block diagram illustrating inner components of the smart LED grow lamp device of FIG. 3 in accordance with an embodiment of the application.

FIG. 3 is a rear view illustrating a smart LED grow lamp device 200 in accordance with an embodiment of the application. FIG. 4 is a front view thereof. FIG. 5 is a top view thereof. FIG. 6 is a bottom view thereof. FIG. 7 is a left side view thereof. FIG. 8 is a right side view thereof. FIG. 9 is a rear top perspective view thereof with an antenna 4 thereof shown in folded or retracted position 910. FIG. 10 is a rear top perspective view thereof with the antenna 4 thereof shown in an unfolded or extended position 1010. And, FIG. 11 is a block diagram illustrating inner components 240 of the smart LED grow lamp device 200 of FIG. 3 in accordance with an embodiment of the application.

FIGS. 3 to 11 illustrate a smart LED grow lamp device 200 according to one embodiment. Referring to FIGS. 4 and 5, the smart LED grow lamp device 200 may have dimensions of approximately 400 mm×400 mm×76 mm. The smart LED grow lamp device 200 includes a cover 210, a base 220, and inner components 240. The cover 210 and base 220 form an enclosure for the internal or inner components 240 of the device 200. Referring to FIGS. 5, 9, and 10, the cover 210 has four (4) threaded holes for receiving screws 1 for securing the cover 210 to the base 220, four (4) hanger hooks or hangers 2, an on/off switch 3, an antenna 4, and a plurality of heat fins 5 formed or mounted on the outer surface 211 of the cover 210. Referring to FIG. 3, the cover 210 also includes a receptacle for receiving a separable power supply cord or cable 6. For ease of storage and transport, the antenna 4 is moveable from a folded or retracted position 910 as shown in FIG. 9 to an unfolded or extended position 1010 as shown in FIG. 10. The smart LED grow lamp device 200 may be suspended horizontally (or approximately horizontally) over and spaced above a plant 201 or group of plants 201 using the hanger hooks 2 such that the outer surface 221 of the base 220 of the device 200 is facing the plant 201 or group of plants 201. The smart LED grow lamp device 200 may also be mounted in alternate positions (e.g., vertically, inclined, upside down, etc.) depending on the light requirements of the plant 201.

Referring to FIG. 6, the base 220 includes a glass cover 7, a reflector cover 8, a PCB board 9, two (2) laser diodes 10, and a set or array 230 of normal (i.e., non-laser) LEDs or LED chips 16. The LED array 230 includes LEDs 16 adapted to emit light having wavelengths of 430 nm or approximately 430 nm (e.g., 430+/−10 nm) and 660 nm or approximately 660 nm (e.g., 660+/−10 nm), at least one LED 11 adapted to emit light having a wavelength of 730 nm or approximately 730 nm (e.g., 730+/−10 nm), and at least one LED 12 adapted to emit UVB light. According to one embodiment, the PCB board 9 is recessed from the outer surface 221 of the base 220 and the reflector cover 8 angles inward accordingly. Referring to FIG. 4, the lamp device 200 may include a power on LED indicator lamp 19 for indicating the on/off status of the device 200, a WIFI connected LED indicator lamp 20 for indicating the connection of the device 200 to a WIFI network 351, a UVB on LED indicator lamp 21 for indicating that the device 200 is emitting UVB light, and a reset button 22 for resetting the device 200. According to one embodiment, the lamp device 200 may be voice activated to allow for direct control of the device 200 by a user.

According to one embodiment, the smart LED grow lamp device 200 may also include a camera 18 mounted on the outer surface 221 of the base 220 proximate to one of the laser diodes 10, as shown in FIG. 6. The camera 18 allows a user to view a plant 201 or group of plants 201 and monitor plant growth status when the user is not in, near, or able to access the plant growing area. When the device 200 is paired with the lamp control APP 331 running on the user's wireless device 300, the camera 18 may be selectively turned on and off using the APP 331 by selecting among various cameral control options. When the camera 18 is turned on, the user can control the camera 18 to shoot or record remotely. The user may also select a time schedule for the camera 18 enabling the camera 18 to take pictures or video automatically on a daily/weekly/monthly basis. The user may customize the period and time for camera 18 operation. For example, the user may set the camera 18 to shoot every 3 days at 6:00 am and 6:00 pm. Images (or photographs) and video recorded by the camera 18 may be stored in the online store hosting server 2420, in a plant growth big data collection system 2421, or on another server or cloud server 300. Each user may have a dedicated or private storage space in the online store hosting server 2420 for the storage of their images and video. Users may remotely view images and video stored on the server 2420, download images and video form the server 2420 for local storage in their wireless device 300, or delete images and video from the server 2420. In addition, the user may allow the server 2420 to analyze the data, images, and video collected by the camera 18 and adjust the light settings for their device 200 in accordance with the server's recognition of the type of the user's plant 201 and the growing stage of the plant 201.

Referring to FIG. 11, the layout of the inner modules or components 240 of the smart LED grow lamp device 200 is shown. The inner components 240 include a power supply unit 13 mounted on the left-hand side and coupled to the power supply cord 6, a WIFI control unit 14 mounted on the right-hand side, the PCB board 9 mounted in the middle, and the two laser diodes 10 mounted on either side of the PCB board 9.

Figure 12:
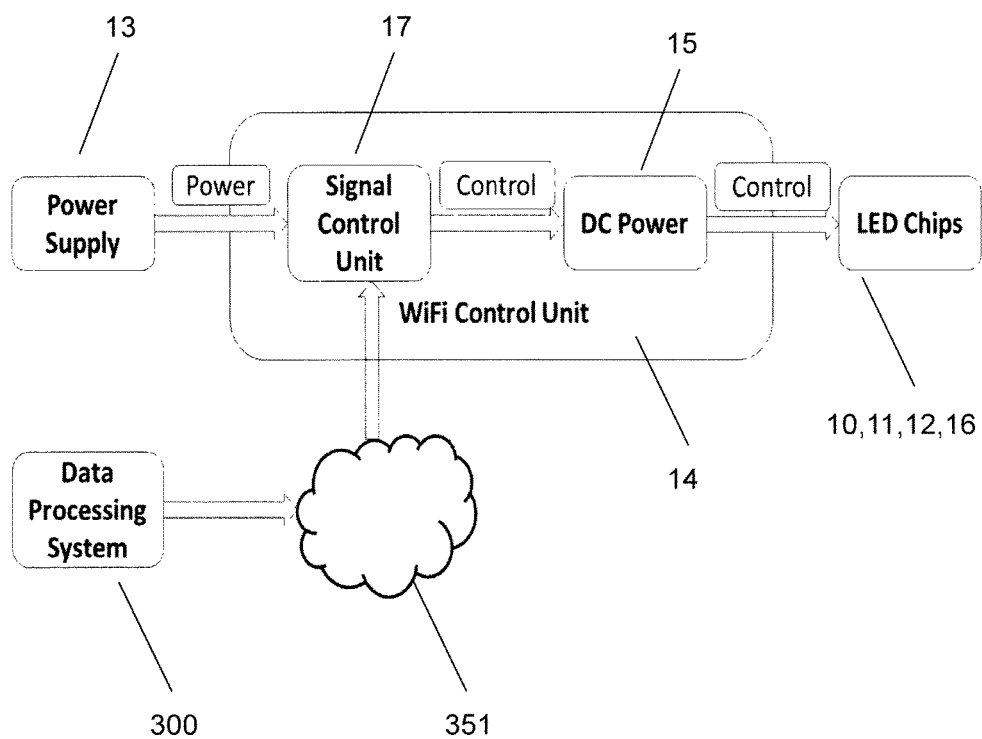
FIG. 12 is a block diagram illustrating inner electronic components of the smart LED grow lamp device of FIG. 3 in accordance with an embodiment of the application.

Referring to FIG. 12, the power supply unit 13 supplies power to a WIFI control unit 14 that includes a signal control unit 17 coupled to a DC power unit 15. The signal control unit 17 of the WIFI control unit 14 receives control signals from the APP 331 running in the data processing system 300 via the network 351 and transfers the control signals to the DC power unit 15. The DC power unit 15 converts the control signals using power from the power supply unit 13 into low voltage DC power control signals and outputs these to drive/control the LED chips 10, 11, 12, 16, resulting in the LED chips 10, 11, 12, 16 turning on and off, etc. Similarly, the control unit 17 may control operation of the camera 18.

Figure 13:
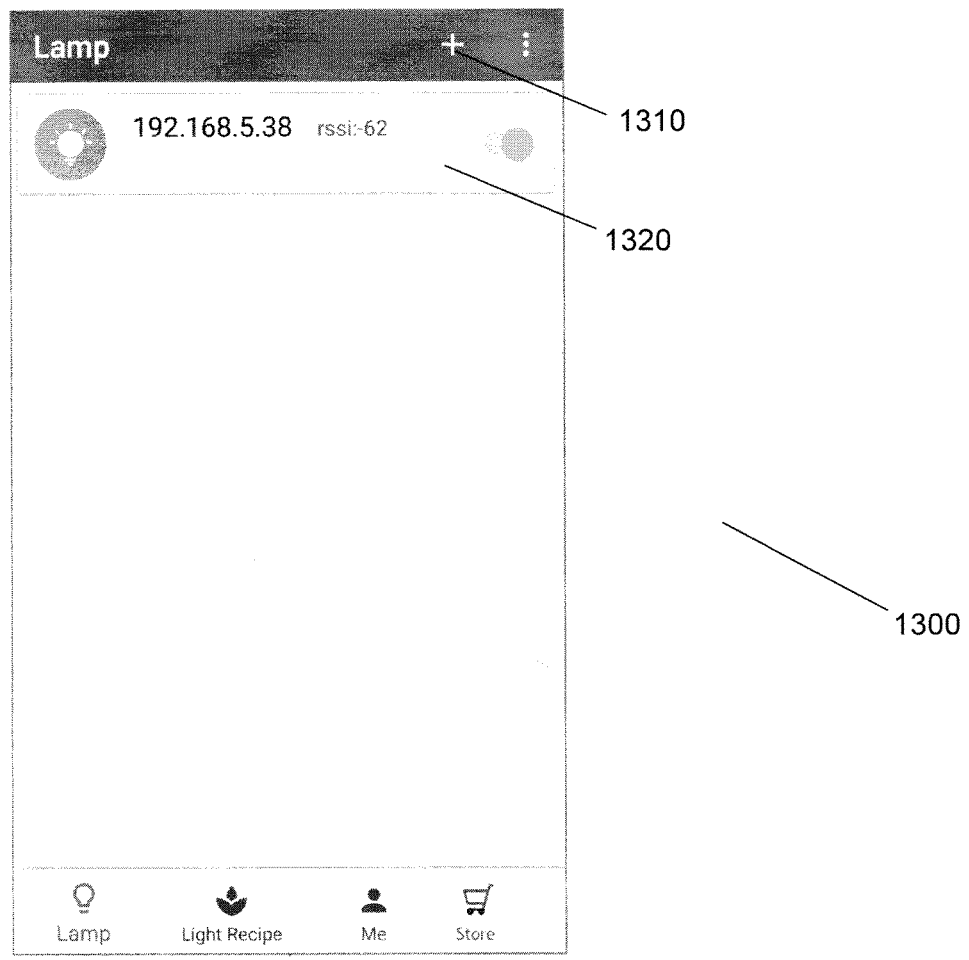
FIG. 13 is a screen capture illustrating a screen for the addition of a smart LED grow lamp device to the control panel of the lamp control APP in accordance with an embodiment of the application.
Figure 14:
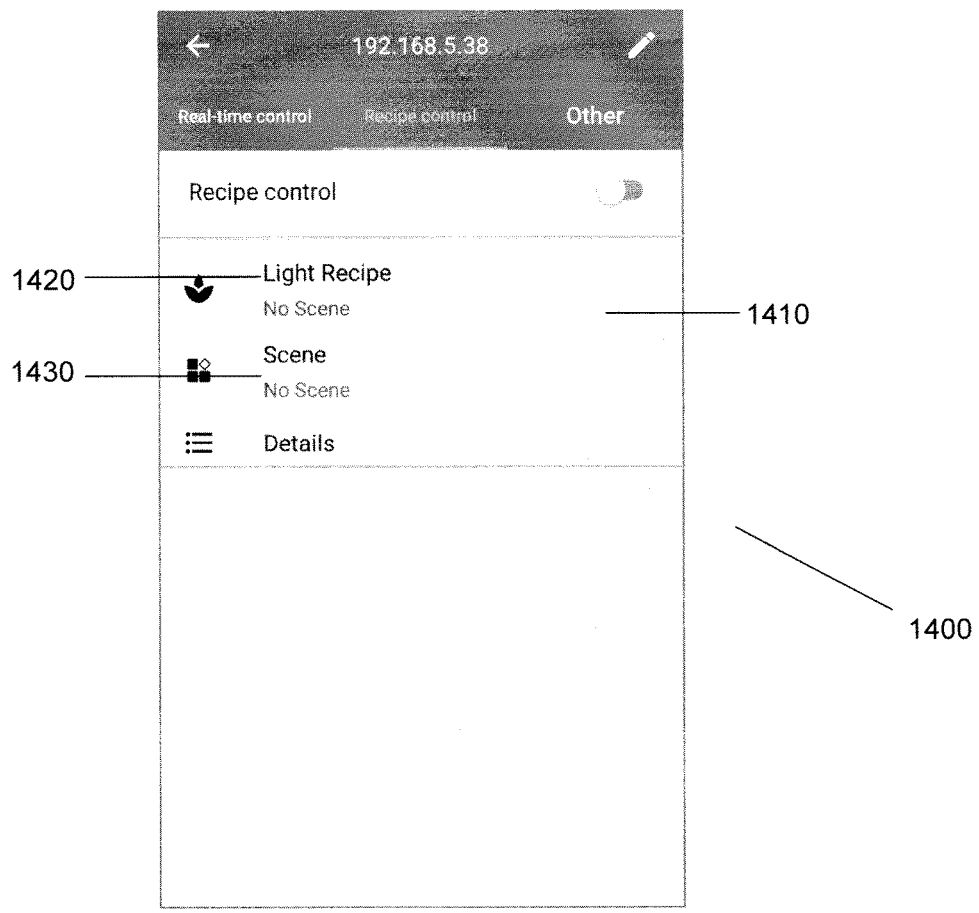
FIG. 14 is a screen capture illustrating a screen for the selection of a light recipe and stage (or scene) for control of a smart LED grow lamp device by the lamp control APP in accordance with an embodiment to the application.

FIG. 13 is a screen capture illustrating a screen 1300 for the addition of a smart LED grow lamp device 200 to the control panel of the lamp control APP 331 in accordance with an embodiment of the application. And, FIG. 14 is a screen capture illustrating a screen 1400 for the selection of a light recipe and stage (or scene) for control of a smart LED grow lamp device 200 by the lamp control APP 331 in accordance with an embodiment to the application. The screen 1300 illustrated in FIG. 13 shows the lamp devices 200 connected to a user's APP 331, provides an interface for the addition of the new lamp devices 200, and provides means for switching connected lamp devices 200 on and off. The screen 1400 illustrated in FIG. 14 shows a graphical user interface or user interface for selecting a light recipe 2410 for a lamp device 200.

Referring to FIG. 13, a user may link the smart LED grow lamp device 200 to the APP 331 by selecting the "Add" icon or button 1310 on the screen 1300 via WIFI. An icon or button 1320 representing the added device 200 (e.g., "192.168.5.38") is then shown on the screen 1300. After adding the lamp device 200, the user may select the added device 200, 1320 and the APP 331 will jump to the page or screen 1400 shown in FIG. 14. On this screen 1400, the user is presented with a window 1410 in which the user may select a "Light Recipe" icon or button 1420 to select a light recipe or a "Scene" (or stage) icon or button 1430 to select a scene or stage for the lamp device 200. Each light recipe 2410 may have one or more scenes or stages having different spectral and time settings. In addition, the user may control the lamp device 200 using "Real-time control" or "Recipe control" by making the appropriate selection on this screen.

Figure 15:
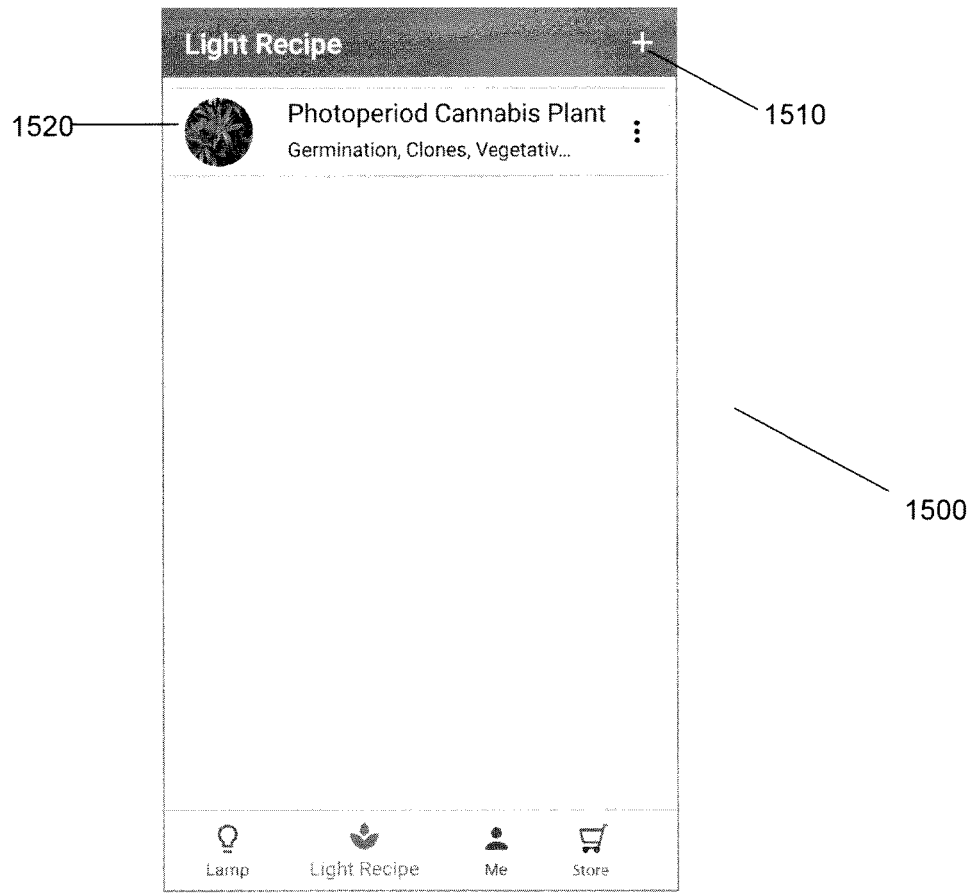
FIG. 15 is a screen capture illustrating a light recipe listing and addition screen of the lamp control APP in accordance with an embodiment of the application.
Figure 16:
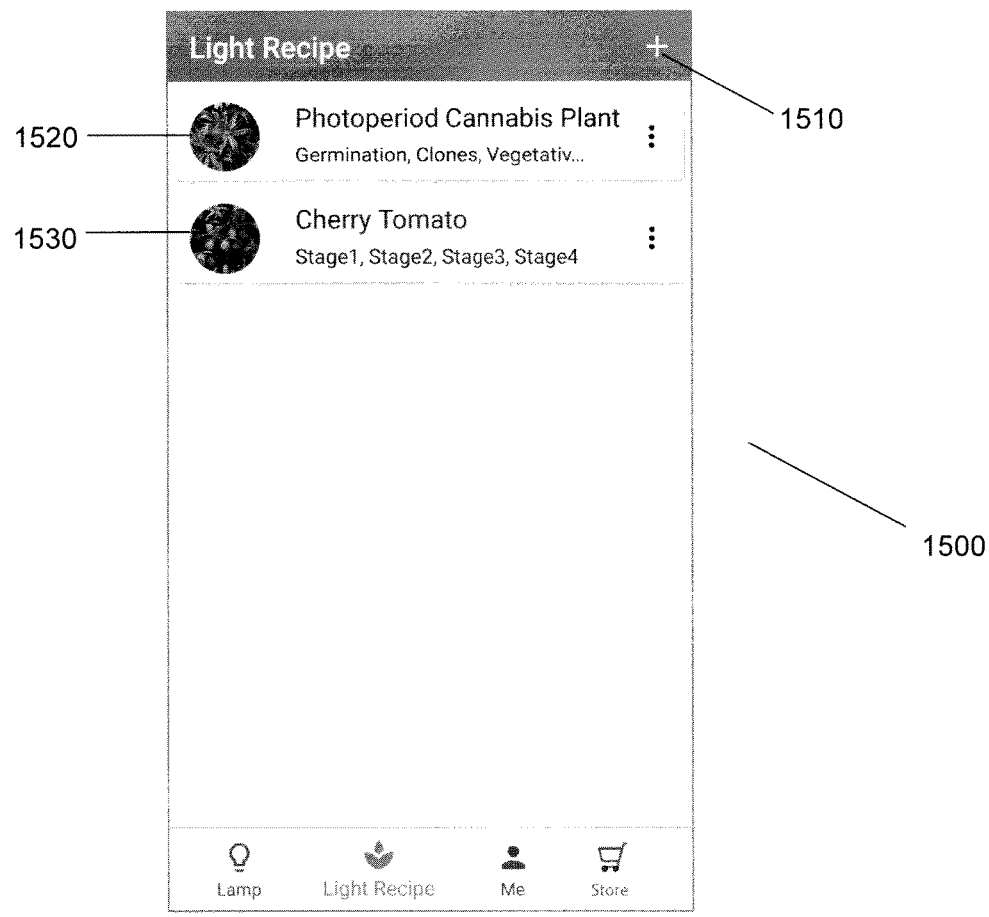
FIG. 16 is a screen capture illustrating the light recipe listing and addition screen of FIG. 15 to which a second light recipe has been added in accordance with an embodiment of the application.
Figure 17:
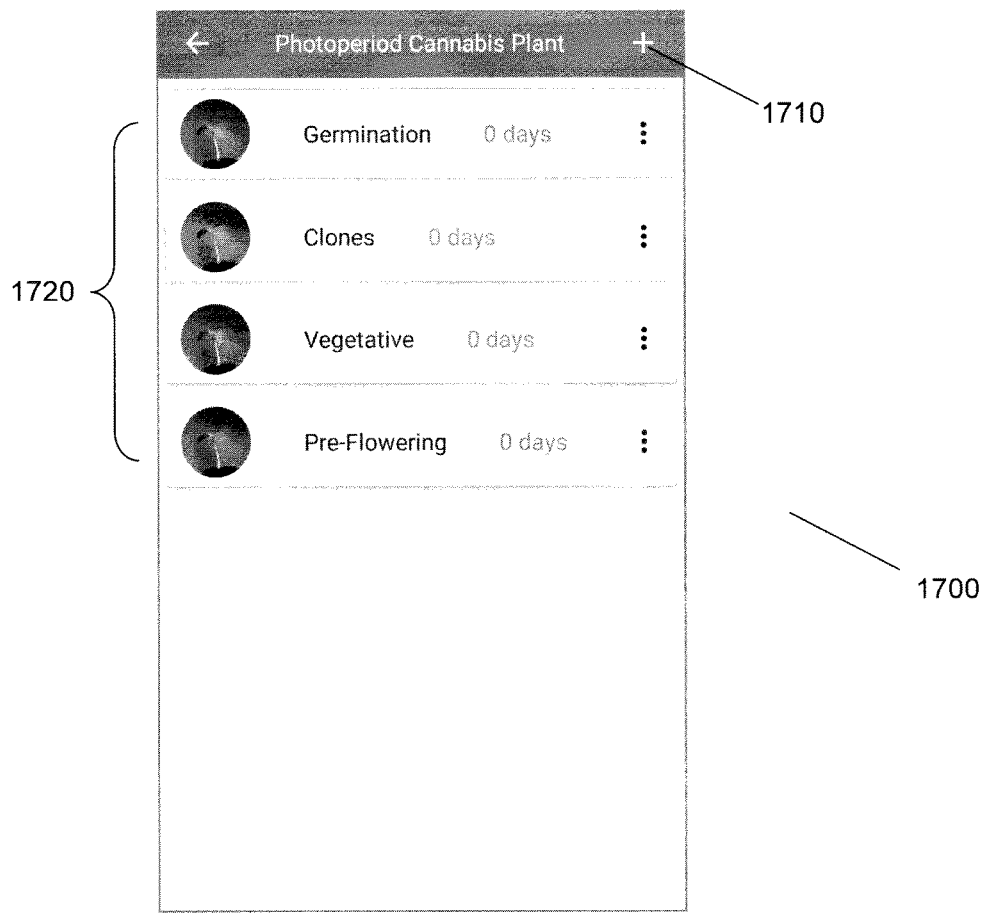
FIG. 17 is a screen capture illustrating a stage status screen of the lamp control APP for indicting stage statuses for a light recipe in accordance with an embodiment of the application.
Figure 18:
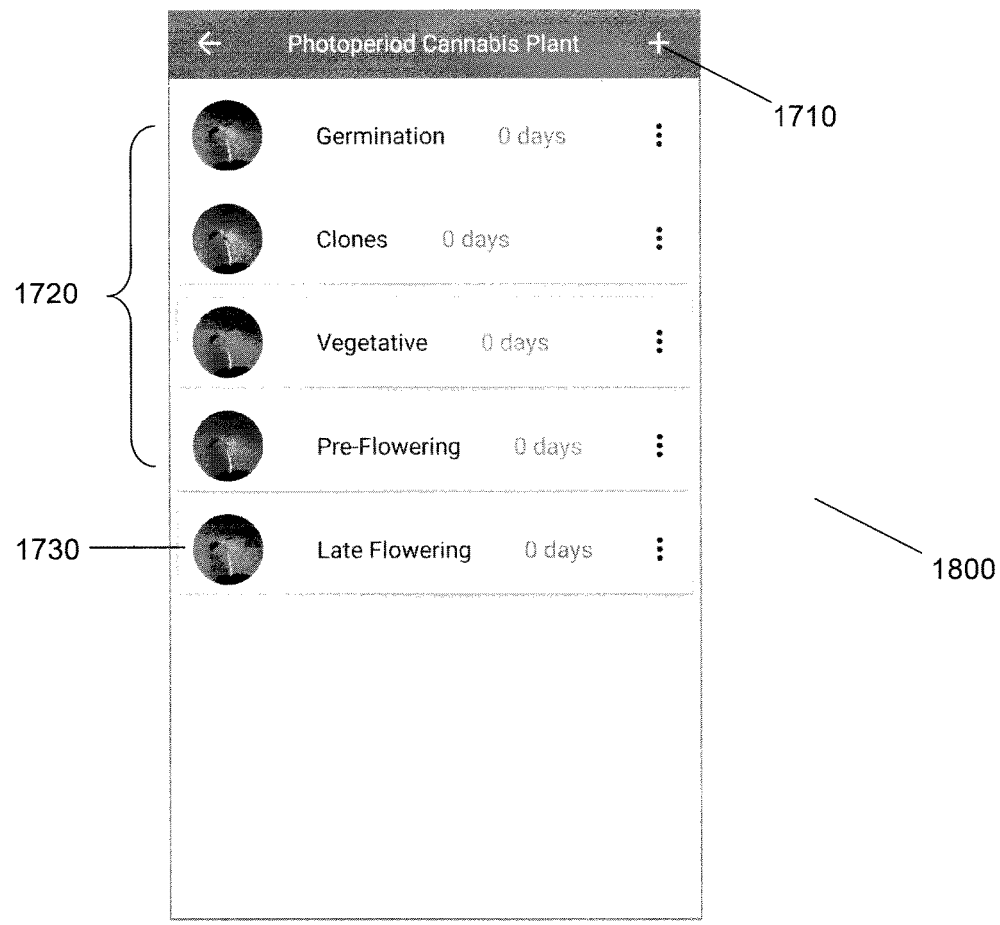
FIG. 18 is a screen capture illustrating the stage status screen of FIG. 17 to which a new stage status has been added in accordance with an embodiment of the application.
Figure 20:
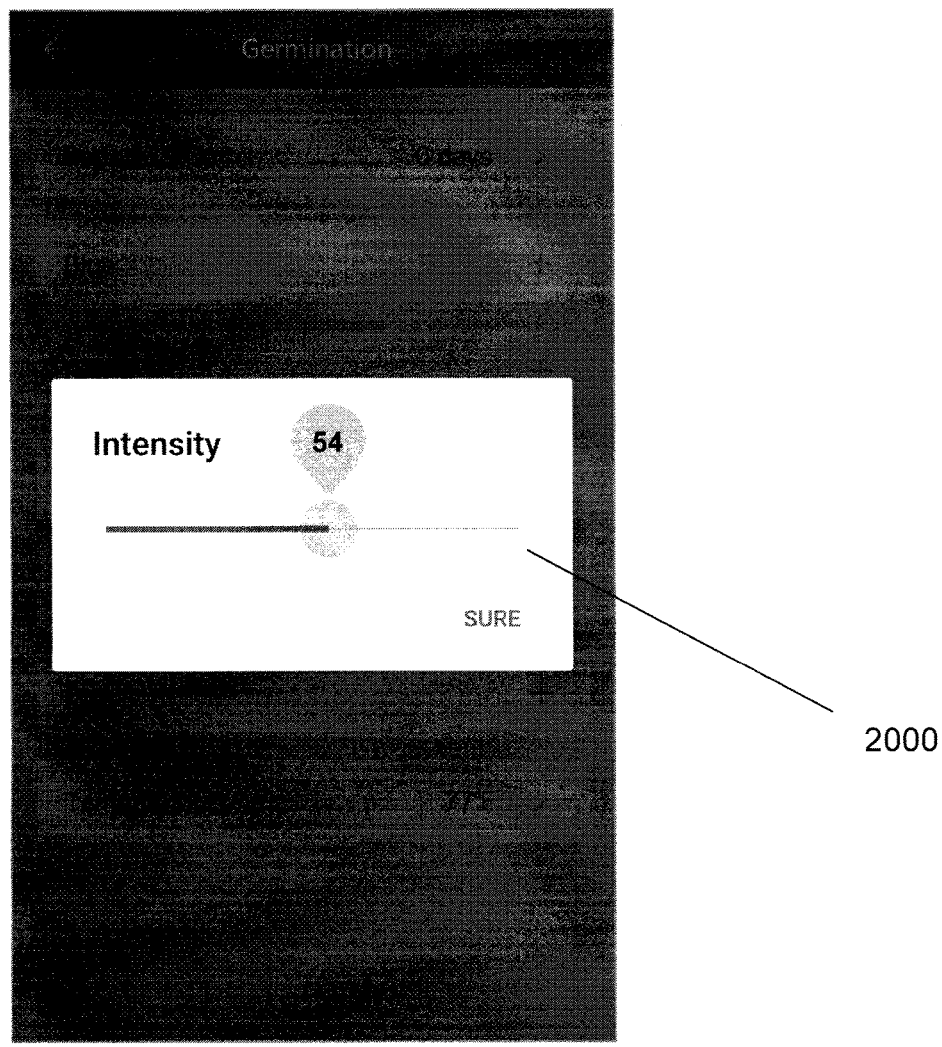
FIG. 20 is a screen capture illustrating a pop-up window (or dialog box) of the light setting selection screen of FIG. 19 for setting the light intensity for one kind (or wavelength) of light in accordance with an embodiment of the application.
Figure 21:
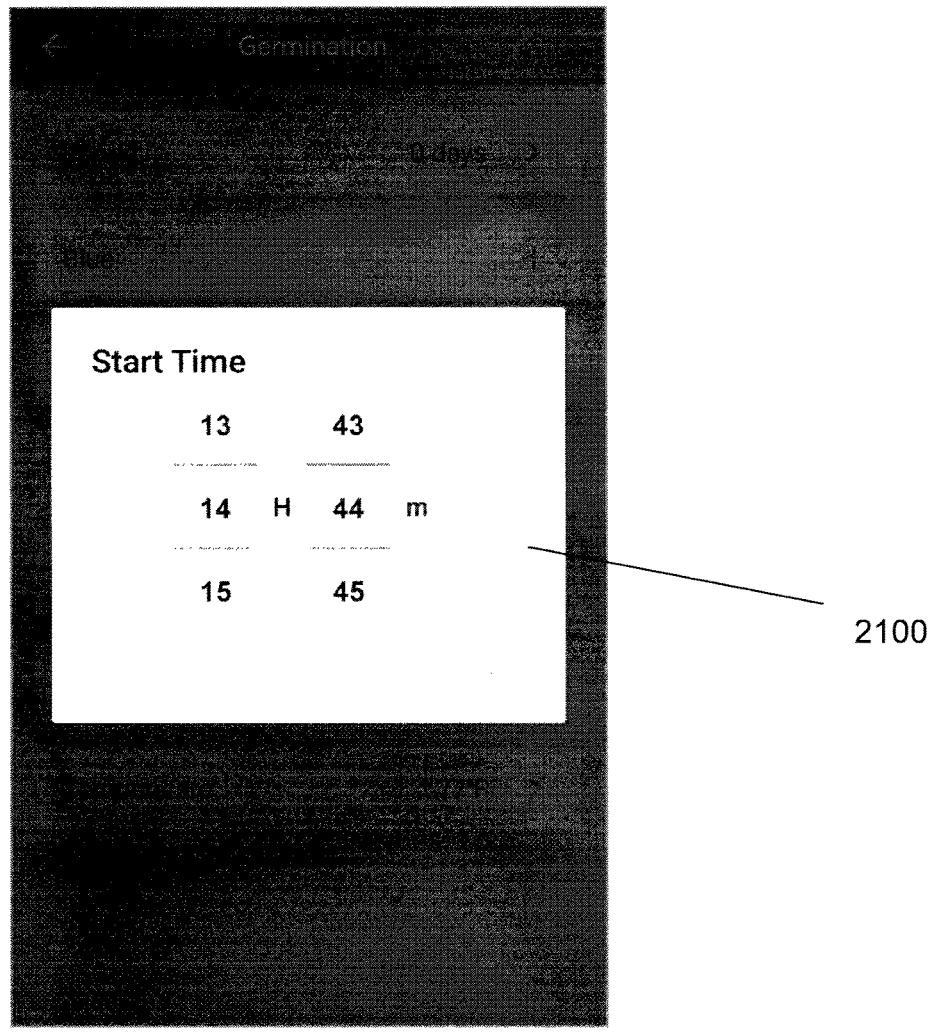
FIG. 21 is a screen capture illustrating a pop-up window (or dialog box) of the light setting selection screen of FIG. 19 for setting the start time for one kind (or wavelength) of light in accordance with an embodiment of the application.
Figure 22:
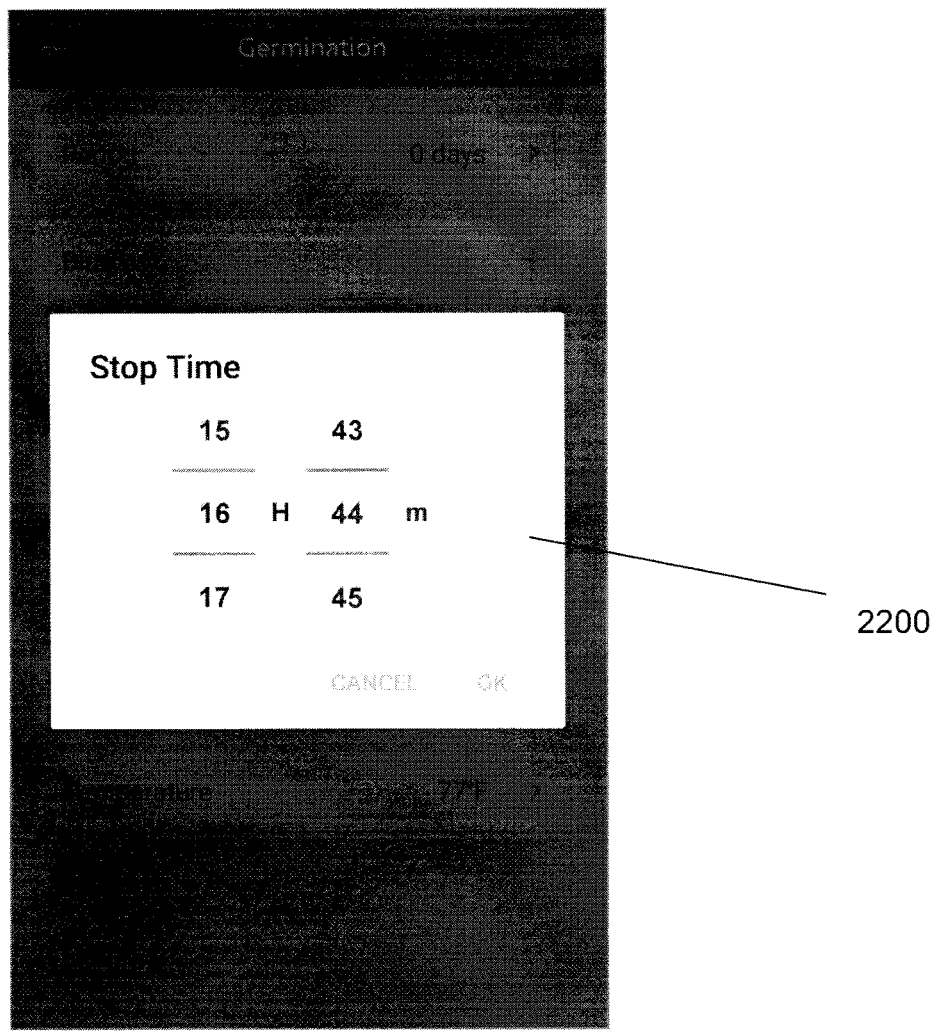
FIG. 22 is a screen capture illustrating a pop-up window (or dialog box) of the light setting selection screen of FIG. 19 for setting the stop time for one kind (or wavelength) of light in accordance with an embodiment of the application.

FIG. 15 is a screen capture illustrating a light recipe listing and addition screen 1500 of the lamp control APP 331 in accordance with an embodiment of the application. FIG. 16 is a screen capture illustrating the light recipe listing and addition screen 1500 of FIG. 15 to which a second light recipe has been added in accordance with an embodiment of the application. FIG. 17 is a screen capture illustrating a stage status screen 1700 of the lamp control APP 331 for indicting stage statuses for a light recipe in accordance with an embodiment of the application. FIG. 18 is a screen capture illustrating the stage status screen 1700 of FIG. 17 to which a new stage status has been added in accordance with an embodiment of the application. FIG. 19 is a screen capture illustrating a light setting selection screen 1900 of the lamp control APP 331 in accordance with an embodiment of the application. FIG. 20 is a screen capture illustrating a pop-up window (or dialog box) 2000 of the light setting selection screen 1900 of FIG. 19 for setting the light intensity for one kind (or wavelength) of light in accordance with an embodiment of the application. FIG. 21 is a screen capture illustrating a pop-up window (or dialog box) 2100 of the light setting selection screen 1900 of FIG. 19 for setting the start time for one kind (or wavelength) of light in accordance with an embodiment of the application. FIG. 22 is a screen capture illustrating a pop-up window (or dialog box) 2200 of the light setting selection screen 1900 of FIG. 19 for setting the stop time for one kind (or wavelength) of light in accordance with an embodiment of the application. And, FIG. 23 is a screen capture illustrating the set up of one kind (or wavelength) of light on the light setting selection screen 1900 of FIG. 19 in accordance with an embodiment of the application.

FIGS. 15 to 23 show procedures for scheduling lighting control for the smart LED grow lamp device 200 according to one embodiment. When a user is viewing the light recipe selection screen 1500 as shown in FIG. 15, which initially shows a first light recipe icon or button 1520 representing a first light recipe (e.g., "Photoperiod Cannabis Plant") 2410, the user may press or select the "Add" icon 1510 to add a new light recipe icon or button 1530 representing a second light recipe (e.g., "Cherry Tomato") 2410 as shown in FIG. 16. Upon selecting a light recipe icon (e.g., 1520), the APP 331 will then jump to the stage status screen 1700 shown in FIG. 17. The stage status screen 1700 presents a variety of stage status icons or buttons 1720 representing various stages (e.g., "Germination", "Clones", "Vegetative", "Pre-Flowering", etc.) in the growth or life cycle of the subject plant (e.g., a "Photoperiod Cannabis Plant") 201. The user may press or select the "Add" button or icon 1710 on the screen 1700 shown in FIG. 17 and a new stage status icon or button 1730 will appear as shown in FIG. 18. By pressing or selecting a stage status icon or button 1720, 1730 (e.g., "Germination"), the user may adjust any type (or wavelength) of light, the intensity of light, and the working hours (i.e., start and stop or on and off times) for the light as shown in FIGS. 19 to 23. In addition to the five wavelength settings shown in FIG. 19, the user may also set the period or duration (e.g., time period in a day and number of days for the whole recipe) for the recipe to execute and suggest a temperature for plant growth.

Figure 24:
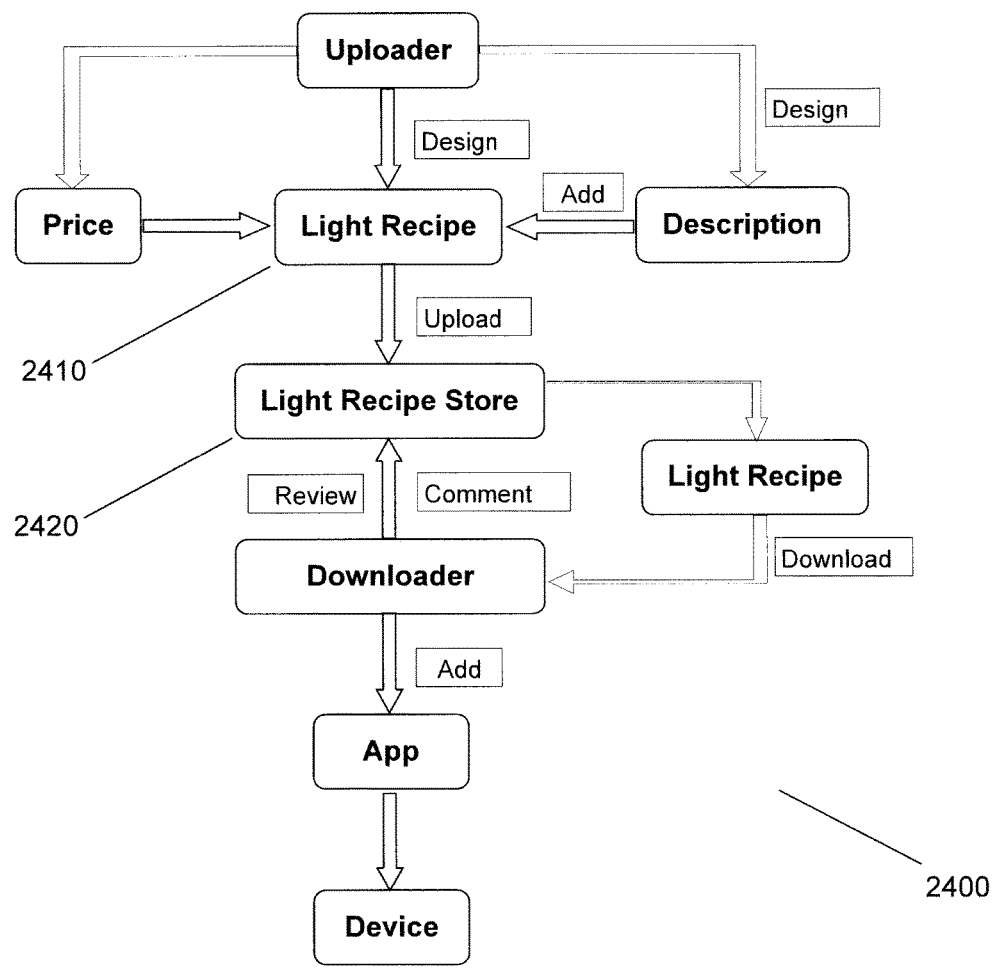
FIG. 24 is a flow diagram illustrating operations of a light settings (or recipe) share function and online store in accordance with an embodiment of the application.

FIG. 24 is a flow diagram illustrating operations 2400 of a light settings (or recipe) 2410 share function and online store 2420 in accordance with an embodiment of the application. The entire plant status, configuration, and settings process described above may be referred to as a "light recipe" 2410. A light recipe may be generated and stored as an individual settings file. This settings file may be uploaded into a light recipe sharing platform (e.g., on a server 300) which may be referred to as a "light recipe store" 2420. An uploader (i.e., uploading user) may add text and picture (or image) descriptions (e.g., via the camera 18, etc.) to the light recipe 2410. The uploader may also issue or set a price for his or her light recipe 2410. Other users may review all of the recipes and their descriptions as stored in the light recipe store 2420. These users (i.e., downloaders or downloading users) may download or buy one or more light recipes 2410. After downloading, the light recipe 2410 will be added into the downloader's APP 331 on the downloader's device 300 automatically so that the downloading user may apply the settings included in the light recipe 2410 directly and immediately to their smart LED grow lamp device 200. In addition, the downloader may provide comments and ratings on the recipes 2410 they use and these comments and ratings may be posted or published to other users via the light recipe store 2420.

According to one embodiment, the smart LED grow lamp device 200 may include all of the LEDs 10, 11, 12, 16, the camera 18, and the functionality described above (the "full version"). According to another embodiment, the smart LED grow lamp device 200 may include all of the LEDs and functionality described above except for the laser LEDs 10 and associated components and functionality (the "protein version"). According to another embodiment, the smart LED grow lamp device 200 may include all of the LEDs and functionality described above except for the laser LEDs 10, UVB LEDs 12, and associated components and functionality (the "normal version").

Thus, according to one embodiment, there is provided a smart LED grow lamp device 200, comprising: a cover 210 mounted over a base 220; an array of non-laser LEDs 230 mounted on an outer surface 221 of the base 220, the array of non-laser LEDs 230 selectively operable to illuminate at least one plant 201; at least one laser LED 10 mounted on the outer surface 221 of the base 220, the at least one laser LED selectively operable to illuminate the at least one plant 201; a plurality of heat fins 5 formed on an outer surface 211 of the cover 210 for dissipating heat generated by the array of non-laser LEDs 230 and the at least one laser LED 10; an antenna 4 adapted to receive control signals; and, a control unit 14 coupled to the antenna 4, the array of non-laser LEDs 230, and the at least one laser LED 10 and adapted to process the control signals and control operations of the array of non-laser LEDs 230 and the at least one laser LED 10.

The above device 200 may further include at least one hanger 2 mounted on the cover 210 for positioning the base 220 proximate the at least one plant 201. The device 200 may further include at least one camera 18 mounted on the outer surface 221 of the base 220 for generating images for use in monitoring growth of the at least one plant 201. The at least one plant 201 may be at least one cannabis plant 201 and the array of non-laser LEDs 230 may include at least one non-laser LED 16 adapted to emit light having a wavelength of 430 nm or approximately 430 nm, at least one non-laser LED 16 adapted to emit light having a wavelength of 660 nm or approximately 660 nm, at least one non-laser LED 11 adapted to emit light having a wavelength of 730 nm or approximately 730 nm, and at least one non-laser LED 12 adapted to emit UVB light. The control signals may be received from a wireless device 300 running a lamp control application 331. The control signals may implement a light recipe 2410 including type, intensity, and duration selections for the array of non-laser LEDs 230 and the at least one laser LED 10. The antenna 4 may be movable from a folded position 910 to an extended position 1010. And, the control unit 14 may be adapted to transmit the images and related data to at least one of a wireless device 330 running a lamp control application 331, an online light recipe store server 2420, a big data collection system 2421, and a global control cloud server 2422.

Aspects of the above described methods, systems, and devices may be summarized with the aid of a flowchart.

Figure 25:
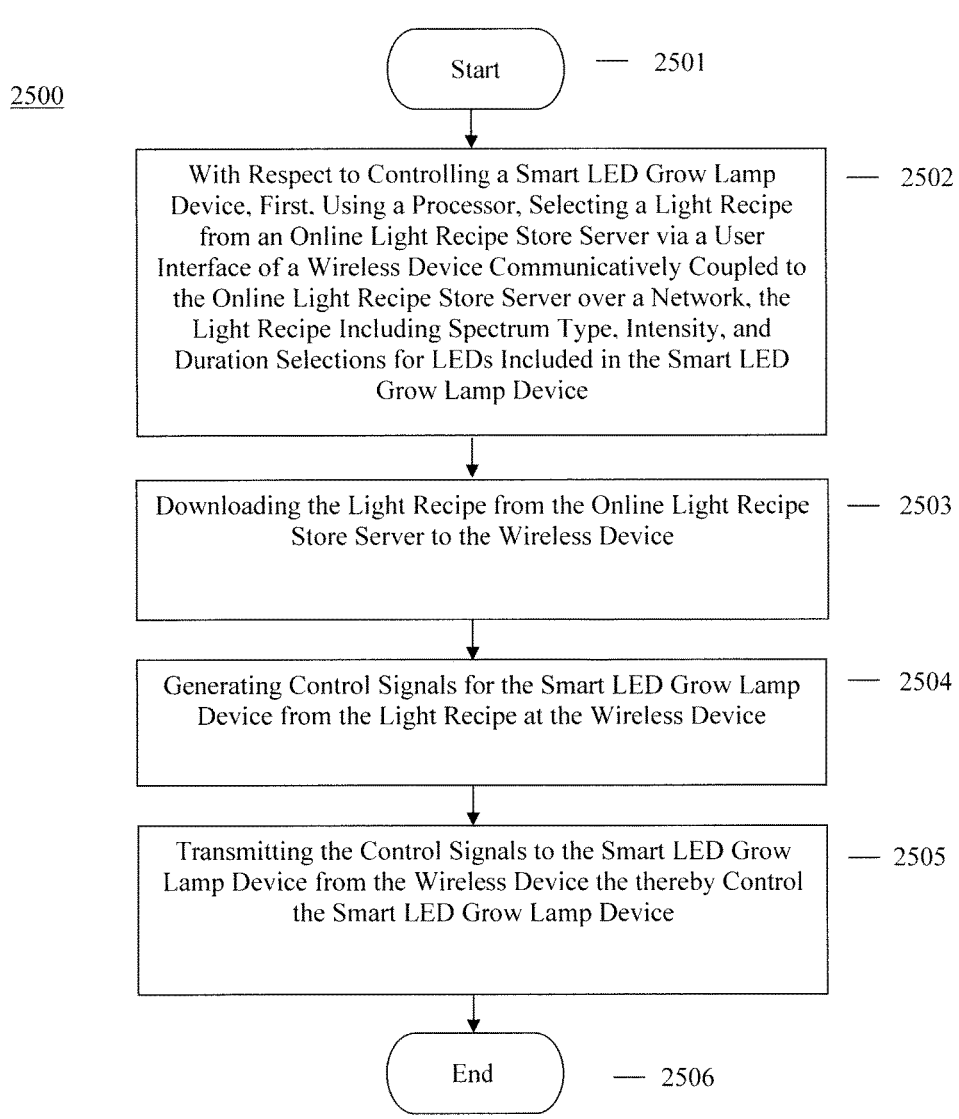
FIG. 25 is a flow chart illustrating operations of modules within a data processing system for controlling a smart LED grow lamp device, in accordance with an embodiment of the application; and, FIG. 26 is a block diagram illustrating a grow lighting system having distributed smart LED grow lamp devices for implementing a "following mode" of operation in accordance with an embodiment of the application.

FIG. 25 is a flow chart illustrating operations 2500 of modules (e.g., 331) within a data processing system 300 (e.g., a smart phone 300) for controlling a smart LED grow lamp device 200, in accordance with an embodiment of the application.

At step 2501, the operations 2500 start.

At step 2502, using a processor 320, a light recipe 2410 is selected from an online light recipe store server 2420 via a user interface 380 of a wireless device 300 communicatively coupled to the online light recipe store server 2420 over a network 351, the light recipe 2410 including spectrum type, intensity, and duration selections for LEDs 10, 11, 12, 16 included in the smart LED grow lamp device 200.

At step 2503, the light recipe 2410 is downloaded from the online light recipe store server 2420 to the wireless device 300.

At step 2504, control signals are generated for the smart LED grow lamp device 200 from the light recipe 2410 at the wireless device 300.

At step 2505, the control signals are transmitted to the smart LED grow lamp device 200 from the wireless device 300 to thereby control the smart LED grow lamp device 200.

At step 2506, the operations 2500 end.

The above method may further include generating a user defined light recipe 2410 at the wireless device 300 using a lamp control application (APP) 331. The lamp control application (APP) 331 may include a default light recipe 2410. The smart LED group lamp device 200 may be mounted over and spaced from at least one plant 201. The method may further include monitoring growth of the at least one plant 201 using images generated by a camera 18 mounted on the smart LED grow lamp device 200. The method may further include uploading the images from the camera 18 to the online light recipe store server 2420 for storage and remote access by the wireless device 300. The method may further include associating the images and light recipe 2410 at the online light receipt store server 2420 to enable further analysis including the remote diagnosis of plant growth problems and automatic adjustment of the light recipe 2410. The method may further include exporting the light recipes 2410, images, and related data to a big data collection system 2421. The at least one plant 201 may be at least one cannabis plant 201 and the LEDs 10, 11, 12, 16 included in the smart LED grow lamp device 200 may include at least one laser LED 10, at least one non-laser LED 16 adapted to emit light having a wavelength of 430 nm or approximately 430 nm, at least one non-laser LED 16 adapted to emit light having a wavelength of 660 nm or approximately 660 nm, at least one non-laser LED 11 adapted to emit light having a wavelength of 730 nm or approximately 730 nm, and at least one non-laser LED 12 adapted to emit UVB light. The smart LED grow lamp device 200 may be one of a plurality of smart LED grow lamp devices 200, 2620, 2630, 2640, 2650 located at a plurality of respective locations 2611, 2621, 2631, 2641, 2651. And, the method may further include transmitting the control signals to the plurality of smart LED grow lamp devices 200, 2620, 2630, 2640, 2650 from the wireless device 300 via a global control cloud server 2422 communicatively coupled to the plurality of smart LED grow lamp devices 200, 2620, 2630, 2640, 2650 over the network 351 to thereby control the plurality of smart LED grow lamp devices 200, 2620, 2630, 2640, 2650.

According to one embodiment, each of the above steps 2501-2506 may be implemented by a respective software module 331. According to another embodiment, each of the above steps 2501-2506 may be implemented by a respective hardware module 321 (e.g., application-specific hardware 321). According to another embodiment, each of the above steps 2501-2506 may be implemented by a combination of software 331 and hardware modules 321. For example, FIG. 25 may represent a block diagram illustrating the interconnection of application-specific hardware modules 2501-2506 (collectively 321) within the data processing system or systems 300, each hardware module 2501-2506 adapted or configured to implement a respective step of the method of the application.

According to one embodiment, certain implementations of the functionality of the present application are sufficiently mathematically, computationally, or technically complex that application-specific hardware (e.g., 321) or one or more physical computing devices (e.g., 300) (using appropriate executable instructions (e.g., 331)) may be necessary or essential to perform that functionality, for example, due to the volume or complexity of the calculations involved and/or to provide results substantially in real-time.

While aspects of this application are primarily discussed as a method, a person of ordinary skill in the art will understand that the apparatus discussed above with reference to a data processing system 300 may be programmed to enable the practice of the method of the application. Moreover, an article of manufacture for use with a data processing system 300, such as a pre-recorded storage device or other similar computer readable medium or computer program product including program instructions recorded thereon, may direct the data processing system 300 to facilitate the practice of the method of the application. It is understood that such apparatus, products, and articles of manufacture also come within the scope of the application.

In particular, the sequences of instructions which when executed cause the method described herein to be performed by the data processing system 300 may be contained in a data carrier product according to one embodiment of the application. This data carrier product may be loaded into and run by the data processing system 300. In addition, the sequences of instructions which when executed cause the method described herein to be performed by the data processing system 300 may be contained in a computer software product or computer program product (e.g., comprising a non-transitory medium) according to one embodiment of the application. This computer software product or computer program product may be loaded into and run by the data processing system 300. Moreover, the sequences of instructions which when executed cause the method described herein to be performed by the data processing system 300 may be contained in an integrated circuit product (e.g., a hardware module or modules 321) which may include a coprocessor or memory according to one embodiment of the application. This integrated circuit product may be installed in the data processing system 300.

The above embodiments may contribute to an improved user controllable grow lighting system 100 and method and may provide one or more advantages. First, the smart LED grow lamp device 200 has a design that satisfies the aesthetic taste of young consumers. Second, the smart LED grow lamp device 200 has a reliable electronic design that addresses the low life-span problem of existing grow lamps. Third, the smart LED grow lamp device 200 has an advanced thermal design which does not include fans and hence addresses the high noise problem of existing grow lamps. The cover 210 and heat fins 5 of the smart LED grow lamp device 200 transfer heat from the inside to the outside of the lamp enclosure without the need for fans. Fourth, the grow light system 100 allows for user controlled optical design which includes the selection of light color and type according to marijuana plant 201 need. For example, blue light (450 nm), red light (660 nm), a ratio of 2:5, plus 730 nm light may be added to take advantage of the Emerson effect to increase photosynthesis. UVB light may be applied to increase the marijuana plant's THC generation. In addition, laser light may be used for enhancing photosynthesis. Furthermore, the UVB LEDs 12 of the smart LED grow lamp device 200 provide UVB light which may increase the yield of some plants (such as marijuana) 201 as may the laser LEDs 10. Finally, the system 100 allows for reduced growing periods and increased yields by using suitable LED chips 10, 11, 12, 16. Fifth, the grow lighting system 100 includes an APP 331 that allows a user to control the smart LED grow lamp device 200 via their smart phone 300. The APP 331 provides for remote WIFI controlled, adjustable, multi-functional grow lighting control especially suitable for marijuana plant 201 cultivation. The APP 331 may be used to control both the intensity and duration of operations of LEDs 10, 11, 12, 16 in the smart LED grow lamp device 200. Sixth, the ability to share light recipes 2410 is provided. Users may upload their light settings (or light recipes 2410) to a platform that hosts a recipe store 2420. The uploading user may quote a price for their light recipe 2410. Other users can review uploaded recipes, pay and download selected recipes, and comment on the recipes included in the recipe store 2420. The online store 2420 allows users to communicate with each other and share their experiences. Seventh, the enclosure design of the smart LED grow lamp device 200 meets the requirements of the IP40 standard. Eighth, the smart LED grow lamp device 200 may be manufactured at lower cost that existing grow lamps. And, ninth, the smart LED grow lamp device 200 may be voice activated, may include a camera 18, and may be intelligently controlled by using images from the camera 18 to monitor plant growth, diagnose problems (e.g., lighting, water, temperature, etc.), generate user alerts, and automatically adjust light settings 2410 accordingly.

The embodiments of the application described above are intended to be examples only. Those skilled in the art will understand that various modifications of detail may be made to these embodiments, all of which come within the scope of the application.

What is claimed is:

1. A method for controlling a smart LED grow lamp device, comprising:
    using a processor, selecting a light recipe from an online light recipe store server via a user interface of a wireless device communicatively coupled to the online light recipe store server over a network, the light recipe including spectrum type, intensity, and duration selections for LEDs included in the smart LED grow lamp device;
    downloading the light recipe from the online light recipe store server to the wireless device;
    generating control signals for the smart LED grow lamp device from the light recipe at the wireless device; and,
    transmitting the control signals to the smart LED grow lamp device from the wireless device to thereby control the smart LED grow lamp device.

2. The method of claim 1, further comprising generating a user defined light recipe at the wireless device using a lamp control application.

3. The method of claim 2, wherein the lamp control application includes a default light recipe.

4. The method of claim 1, wherein the smart LED group lamp device is mounted over and spaced from at least one plant.

5. The method of claim 4, further comprising monitoring growth of the at least one plant using images generated by a camera mounted on the smart LED grow lamp device.

6. The method of claim 5, further comprising uploading the images from the camera to the online light recipe store server for storage and remote access by the wireless device.

7. The method of claim 6, further comprising associating the images and light recipe at the online light receipt store server to enable further analysis including the remote diagnosis of plant growth problems and automatic adjustment of the light recipe.

8. The method of claim 7, further comprising exporting the light recipes, images, and related data to a big data collection system.

9. The method of claim 4, wherein the at least one plant is at least one cannabis plant and wherein the LEDs included in the smart LED grow lamp device include at least one laser LED, at least one non-laser LED adapted to emit light having a wavelength of 430 nm or approximately 430 nm, at least one non-laser LED adapted to emit light having a wavelength of 660 nm or approximately 660 nm, at least one non-laser LED adapted to emit light having a wavelength of 730 nm or approximately 730 nm, and at least one non-laser LED adapted to emit UVB light.

10. The method of claim 1, wherein the smart LED grow lamp device is one of a plurality of smart LED grow lamp devices located at a plurality of respective locations.

11. The method of claim 10, further comprising transmitting the control signals to the plurality of smart LED grow lamp devices from the wireless device via a global control cloud server communicatively coupled to the plurality of smart LED grow lamp devices over the network to thereby control the plurality of smart LED grow lamp devices.

12. A system for controlling a smart LED grow lamp device, comprising:
    a processor coupled to memory; and,
    at least one of hardware and software modules within the memory and controlled or executed by the processor, the modules including computer readable instructions executable by the processor for causing the system to implement the method of claim 1.

13. A smart LED grow lamp device, comprising:
    a cover mounted over a base;
    an array of non-laser LEDs mounted on an outer surface of the base, the array of non-laser LEDs selectively operable to illuminate at least one plant;
    at least one laser LED mounted on the outer surface of the base, the at least one laser LED selectively operable to illuminate the at least one plant;
    a plurality of heat fins formed on an outer surface of the cover for dissipating heat generated by the array of non-laser LEDs and the at least one laser LED;
    an antenna adapted to receive control signals; and,
    a control unit coupled to the antenna, the array of non-laser LEDs, and the at least one laser LED and adapted to process the control signals and control operations of the array of non-laser LEDs and the at least one laser LED.

14. The device of claim 13, further comprising at least one hanger mounted on the cover for positioning the base proximate the at least one plant.

15. The device of claim 13, further comprising at least one camera mounted on the outer surface of the base for generating images for use in monitoring growth of the at least one plant.

16. The device of claim 13, wherein the at least one plant is at least one cannabis plant and wherein the array of non-laser LEDs includes at least one non-laser LED adapted to emit light having a wavelength of 430 nm or approximately 430 nm, at least one non-laser LED adapted to emit light having a wavelength of 660 nm or approximately 660 nm, at least one non-laser LED adapted to emit light having a wavelength of 730 nm or approximately 730 nm, and at least one non-laser LED adapted to emit UVB light.

17. The device of claim 13, wherein the control signals are received from a wireless device running a lamp control application.

18. The device of claim 17, wherein the control signals implement a light recipe including type, intensity, and duration selections for the array of non-laser LEDs and the at least one laser LED.

19. The device of claim 13, wherein the antenna is movable from a folded position to an extended position.

20. The device of claim 15, wherein the control unit is adapted to transmit the images and related data to at least one of a wireless device running a lamp control application, an online light recipe store server, a big data collection system, and a global control cloud server.

* * * * *